US007778590B2

(12) United States Patent
Kogo

(10) Patent No.: US 7,778,590 B2
(45) Date of Patent: Aug. 17, 2010

(54) GAME APPARATUS WITH MUSIC PERFORMANCE PROCESSING UNIT

(75) Inventor: Junichi Kogo, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1174 days.

(21) Appl. No.: 11/393,787

(22) Filed: Mar. 31, 2006

(65) Prior Publication Data

US 2006/0293101 A1 Dec. 28, 2006

(30) Foreign Application Priority Data

Apr. 1, 2005 (JP) ............................ 2005-106085

(51) Int. Cl.
*A63F 13/00* (2006.01)
*G09B 5/08* (2006.01)

(52) U.S. Cl. .................................... 434/307 A; 463/31

(58) Field of Classification Search ..................... 463/1, 463/7, 30–34; 434/307 A
See application file for complete search history.

(56) References Cited

U.S. PATENT DOCUMENTS 5,250,745 A * 10/1993 Tsumura ................. 434/307 A
5,454,723 A * 10/1995 Horii ...................... 434/307 A
5,941,711 A * 8/1999 Iida et al. ................ 434/307 A

FOREIGN PATENT DOCUMENTS

| | | |
|---|---|---|
| JP | 2000-99048 | 4/2000 |
| JP | 2003-14987 | 1/2003 |
| JP | 2003-167576 | 6/2003 |
| JP | 2004-85895 | 3/2004 |
| WO | WO 00/53280 A1 | 9/2000 |

* cited by examiner

*Primary Examiner*—Scott Jones
(74) *Attorney, Agent, or Firm*—McGinn IP Law Group, PLLC

(57) ABSTRACT

Either a "list of song names" or a "list of artist names" is set (in a step S12) as a first display ordering which is to be a basic display ordering for songs, and, along with displaying (in steps S13 and S14) a song selection screen according to a display sequence setting table based on this first display ordering which has been set, particularly an appealing portion of a PV of a song which has been displayed in a song candidate display section and which has been selected with a music selection cursor is displayed in a selected PV display section; and furthermore (in steps S15, S20, S26, and S33) a appealing portion of the song is outputted via speakers.

9 Claims, 18 Drawing Sheets

FIG. 12

| DISPLAY ORDER | ID | SONG NAMES | ARTIST NAMES |
|---|---|---|---|
| 1 | 001631 | A BRAVE WOMAN | TOKKEY |
| 2 | 001216 | ACTIVE VOICE | KOIZUMI KEN |
| 3 | 000991 | AN ENCORE | YURI |
| 4 | 001314 | A SWEET APPLE | SAKURANO AI |
| 5 | 003467 | ATTRACTIVE GIRL | NAGASE IZUMI |
| | | ⋮ | |
| 98 | 002890 | WILD BOY | EIJI |
| 99 | 001890 | WOOD BLOCK | SUZUKI NANA |
| 100 | 000246 | ZOOLOGICAL GARDEN | HIMURO KEIJI |

FIG. 17A

67

| DISPLAY ORDER | ID | SONG NAMES | ARTIST NAMES |
|---|---|---|---|
| 1 | 001631 | A BRAVE WOMAN | TOKKEY |
| 2 | 001216 | ACTIVE VOICE | KOIZUMI KEN |
| 3 | 000991 | AN ENCORE | YURI |
| 4 | 001314 | A SWEET APPLE | SAKURANO AI |
| 5 | 003467 | ATTRACTIVE GIRL | NAGASE IZUMI |
| ⋮ | | | |
| 98 | 002890 | WILD BOY | EIJI |
| 99 | 001890 | WOOD BLOCK | SUZUKI NANA |
| 100 | 000246 | ZOOLOGICAL GARDEN | HIMURO KEIJI |

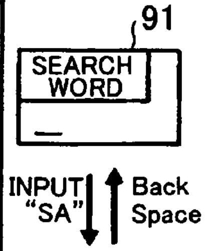

FIG. 17B

67

| DISPLAY ORDER | ID | SONG NAMES | ARTIST NAMES |
|---|---|---|---|
| 1 | 002200 | SADNESS | AISHA |
| 2 | 001333 | SAFARI IN AFRICA | HASEGAWA KOJI |
| 3 | 000388 | SAFETY JOURNEY | HONMA YUKI |
| 4 | 000088 | SAILING FOR THE SEAS | ENDO YOSIMI |
| 5 | 001003 | SAKURA CAFE | AINE |
| ⋮ | | | |
| 16 | 001631 | A BRAVE WOMAN | TOKKEY |
| 17 | 001216 | ACTIVE VOICE | KOIZUMI KEN |
| 18 | 000991 | AN ENCORE | YURI |
| 19 | 001314 | A SWEET APPLE | SAKURANO AI |
| 20 | 003467 | ATTRACTIVE GIRL | NAGASE IZUMI |
| ⋮ | | | |
| 98 | 002890 | WILD BOY | EIJI |
| 99 | 001890 | WOOD BLOCK | SUZUKI NANA |
| 100 | 000246 | ZOOLOGICAL GARDEN | HIMURO KEIJI |

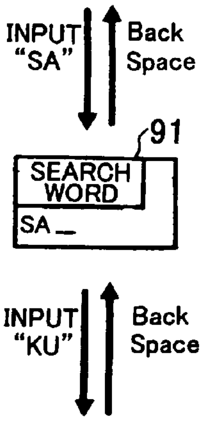

FIG.17C

67

| DISPLAY ORDER | ID | SONG NAMES | ARTIST NAMES |
|---|---|---|---|
| 1 | 000388 | SAFETY JOURNEY | HONMA TUKI |
| 2 | 000088 | SAILING FOR THE SEAS | ENDO YOSIMI |
| 3 | 001003 | SAKURA CAFE | AINE |
| 4 | 002899 | SAKURA FOREVER | FUJII SAYURI |
| 5 | 004212 | SAKURANBO-LOVELY CHERRIES | NAKAJIMA YUKI |
| · | · | · | · |
| 8 | 001631 | A BRAVE WOMAN | TOKKEY |
| 9 | 001216 | ACTIVE VOICE | KOIZUMI KEN |
| 10 | 000991 | AN ENCORE | YURI |
| 11 | 001314 | A SWEET APPLE | SAKURANO AI |
| 12 | 003467 | ATTRACTIVE GIRL | NAGASE IZUMI |
| · | · | · | · |
| 98 | 002890 | WILD BOY | EIJI |
| 99 | 001890 | WOOD BLOCK | SUZUKI NANA |
| 100 | 000246 | ZOOLOGICAL GARDEN | HIMURO KEIJI |

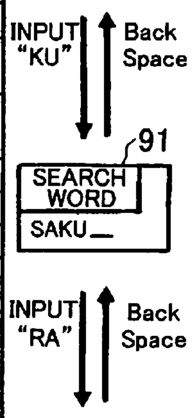

FIG.17D

67

| DISPLAY ORDER | ID | SONG NAMES | ARTIST NAMES |
|---|---|---|---|
| 1 | 001003 | SAKURA CAFE | AINE |
| 2 | 002899 | SAKURA FOREVER | FUJII SAYURI |
| 3 | 004212 | SAKURANBO-LOVELY CHERRIES | NAKAJIMA YUKI |
| 4 | 001631 | A BRAVE WOMAN | TOKKEY |
| 5 | 001216 | ACTIVE VOICE | KOIZUMI KEN |
| · | · | · | · |
| 98 | 002890 | WILD BOY | EIJI |
| 99 | 001890 | WOOD BLOCK | SUZUKI NANA |
| 100 | 000246 | ZOOLOGICAL GARDEN | HIMURO KEIJI |

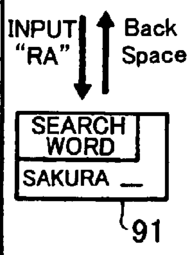

GAME APPARATUS WITH MUSIC PERFORMANCE PROCESSING UNIT

This application claims the priority of Japanese Patent Application No. 2005-106085 filed on Apr. 1, 2005, which is incorporated herein by reference.

BACKGROUND OF THE INVENTION

1. Field of the Invention

The present invention relates to a game apparatus which performs a game using music which is played based on stored music data, and in particular relates to such a game apparatus which, along with extracting corresponding music data based on characters which have been inputted and displaying specifying information with greater priority than other extracted music data, also plays music related to the music data of the specifying information which has been selected, and which furthermore is capable of performing the selection of music which is to be used for the game simply and surely by displaying an image related to music data.

2. Description of the Prior Art

From the past, with a karaoke device or a music game apparatus which is endowed with a selecting function of a desired piece of music from a plurality of stored musical items by a user, and a playing function of the music or the voice related to the item of music which has been selected, it has been general to provide a search function in which a search is performed within the items of music, in order for the piece of music which the user desires to be simply and easily selected from among the plurality of items of music which are registered in advance.

Here, as a search function for searching through the pieces of music, there is a method of inputting a character string which is to be used as, for example, the title of the piece of music or the name of the artist, and of extracting the piece of music which corresponds to this character string. For example, in Japanese Unexamined Patent Publication No. 2000-99048 (in particular, in pages 4 through 5 and FIGS. 4 through 8 thereof), there is described, in relation to a music selection and reservation device which is used while being connected by cable to a karaoke performance device, such a music selection and reservation device which can select a piece of music quickly and moreover simply and conveniently, by, each time it receives character input operation from a user according to some type of search menu from which the user has made a selection, searching automatically through karaoke music items with the character string which has been inputted, and, along with displaying a list of the results of this search, transferring a play reservation signal for the piece of music which the user has specified to the karaoke performance device.

However, with this music selection and reservation device described in the Japanese Unexamined Patent Publication No. 2000-99048, as the information which specifies the pieces of music which are displayed as the search results, only the names of the pieces of music and the names of the artists are displayed. Accordingly, if there is some vagueness in the user's remembrance of the name of the song or the name of the artist, then, with only the name of the song and the name of the artist being displayed as in this prior art, there is a danger that the user will not be able to select the piece of music which he desires in a reliable manner.

Furthermore, in particular when the number of the items of music which have been collected together is very great, as the result of searching, a large number of names of songs and names of artists which resemble one another may be displayed, so that a long time period comes to be required for the task of selecting an item of music, and accordingly the burden on the user is increased. Moreover, there is a danger that he may mistakenly select a piece of music other than the one which he desires, which is undesirable.

SUMMARY OF THE INVENTION

The present invention has been conceived in order to solve these problems with the prior art, and it is related to a game apparatus which by, along with playing music related to music data specified by specifying information which has been selected with a specifying information selection unit, also displaying an image related to the music data, is capable of performing the selection of the music which is to be used by the player in the game in a simple and easy and moreover reliable manner.

In order to achieve this object, the game apparatus according to Claim 1 (for example, the typing game apparatus 1) comprises image display means which displays a predetermined image related to a game (for example, the first liquid crystal display 3 and the second liquid crystal display 4); music data storage means which stores music data (for example, the HDD 55); music performance processing means which plays a song based on music data stored in the music data storage means (for example, the CPU 51 and the sound control circuit 61); a game control means which controls the game based on the song which is played by the music performance processing means (for example, the CPU 51 and the steps S41 through S61); specifying information display means (for example, the CPU 51 and the step S14) which displays, on the image display means, specifying information (for example, the name of a song 17A, the name of its artist 17B, and the image 17C of an appealing portion of its PV) which specifies the music data stored in the music data storage means; character input means which performs character input (for example, the keyboard 6); music extraction means (for example, the CPU 51 and the steps S18 and S24), which, based on characters inputted by the character input means, extracts, from the music data stored in the music data storage means, corresponding music data which corresponds to the characters which have been inputted; priority specifying information display means (for example, the CPU 51 and the steps S19 and S25), which displays, on the image display means, specifying information which specifies the corresponding music data extracted by the music extraction means, in priority before specifying information of other music data; specifying information selection means (for example, the cursor keys 114 and the song selection cursor 18) which selects the specifying information which is displayed on the image display means; selected music performance processing means (for example, the CPU 51 and the steps S20, S26, and S33) which plays a song related to the music data specified by the specifying information which has been selected by the specifying information selection means; and selected music image display means (for example, the CPU 51 and the steps S20, S26, and S33) which displays, on the image display means, an image related to the music data specified by the specifying information which has been selected by the specifying information selection means.

It should be understood that by "is displayed in priority on the image display means" means that the specifying information which specifies the corresponding music data which the player has extracted with the music extraction means is displayed in a state which is easier to select than the specifying information which specifies the other music data; for example, it includes the case when the specifying information for the corresponding music data only is displayed, without displaying the specifying information for the other music data; or the case when the specifying information for the corresponding music data is displayed faster than the specifying information for the other music data; or the case when the specifying information for the corresponding music data is displayed as positioned with its order changed, so as to be positioned higher than the specifying information for the other music data; or the case when the specifying information for the corresponding music data is displayed with its display size made bigger, with its display color changed, or the like than the specifying information for the other music data, so that it is made easy for the eye of the player to stop on it.

Furthermore, the game apparatus according to Claim 2 is the game apparatus of Claim 1 (for example, the typing game apparatus 1), wherein the selected music performance processing means (for example, the CPU 51 and the steps S20, S26, and S33) plays an appealing portion of the song related to the music data which is specified by the specifying information (for example, the name of the song 17A, the name of its artist 17B, and the image 17C of the appealing portion of its PV) which has been selected by the specifying information selection means (for example, the cursor keys 114 and the song selection cursor 18).

Furthermore, the game apparatus according to Claim 3 is the game apparatus of Claim 1 (for example, the typing game apparatus 1), wherein the selected music image display means (for example, the CPU 51 and the steps S20, S26, and S33) displays a promotion video of an appealing portion of the song related to the music data specified by the specifying information (for example, the name of the song 17A, the name of its artist 17B, and the image 17C of the appealing portion of its PV) which has been selected by the specifying information selection means (for example, the cursor keys 114 and the song selection cursor 18).

Yet further, the game apparatuses of the other Claims have particular distinguishing features, as follows.

The game apparatus according to Claim 4 is the game apparatus of Claim 1, wherein the selected music performance processing means plays an appealing portion of the song related to the music data specified by the specifying information which has been selected by the specifying information selection means, and the selected music image display means displays a promotion video of the appealing portion of the song related to the music data specified by the specifying information which has been selected by the specifying information selection means.

Furthermore, the game apparatus according to Claim 5 is the game apparatus of Claim 2, wherein an ordering of the specifying information to be displayed on the image display comprises an ordering based on a search mode which is selected via a search mode selection screen displayed on the image display.

Furthermore, the game apparatus according to Claim 6 is the game apparatus of Claim 3, wherein an ordering of the specifying information to be displayed on the image display comprises an ordering based on a search mode which is selected via a search mode selection screen displayed on the image display.

Further, the game apparatus according to Claim 7 is the game apparatus of Claim 5, wherein the ordering of the specifying information which is displayed on the image display is changeable according to input via the character input means.

Still further, the game apparatus according to Claim 8 is the game apparatus of Claim 5, wherein the specifying information which has been selected by the specifying information selection means is indicated and shown on the image display by a specified music selection cursor, and is displayed in a larger size, as compared to the specifying information which is not being selected by the specifying information selection means.

Furthermore, the game apparatus according to Claim 9 is the game apparatus of Claim 1, wherein the image display comprises a first display section displays a character string which is to be inputted during a typing game, and a second display section which displays an image.

Furthermore, the game apparatus according to Claim 10 is the game apparatus of Claim 1, wherein the character input means comprises a keyboard on which a plurality of keys which correspond to a plurality of characters are arranged, the game apparatus further comprising correctness determination means which determines whether or not a character string which has been inputted by the character input means agrees with a character string related to the song which is played by the music performance processing means, and wherein the game control means controls the game, based on a result of determination by the correctness determination means.

Furthermore, the game apparatus according to Claim 11 is the game apparatus of Claim 10, wherein the character string related to the song which is played by the music performance processing means comprises a character string which specifies lyrics of that song, and, after a correctness determination by the correctness determination means has been completed, a character string which specifies an entire lyrics of the song is displayed on the image display in a scrolling manner.

BRIEF DESCRIPTION OF THE DRAWINGS

FIG. 12 is a schematic figure showing an example of a display sequence setting table;

FIG. 15 is another flow chart of a song selection processing program of the typing game apparatus according to this embodiment;

FIG. 17 is a schematic figure showing the manner in which a display sequence setting table changes, when a character string for searching for the name of a song has been inputted; and FIG. 18 is a figure showing the song selection screen when "Sakura" has been inputted as the character string for searching for the name of a song.

DESCRIPTION OF THE PREFERRED EMBODIMENT

In the following, the game apparatus according to the present invention will be explained in detail with reference to the drawings, based on concrete embodiment thereof as a housing type typing game apparatus of the sort generally set up in a game arcade or the like. This typing game apparatus 1 according to the embodiments below is constituted so as, along with reproducing songs via a speaker, also to display the lyrics corresponding to the song which is reproduced in sequence on a display, and so that the player performs playing by typing the displayed lyrics in sequence on a keyboard. Moreover, the typing game which is implemented in practice consists of a plurality of stages corresponding to the number of verses in the song which is to be reproduced, and if, at the time point when one stage has been completed, the number of typing errors made by the player is less than a predetermined number, then the game proceeds to a stage which corresponds to the next verse of the song, so that it is possible to perform the typing game continuously.

Figure 1:
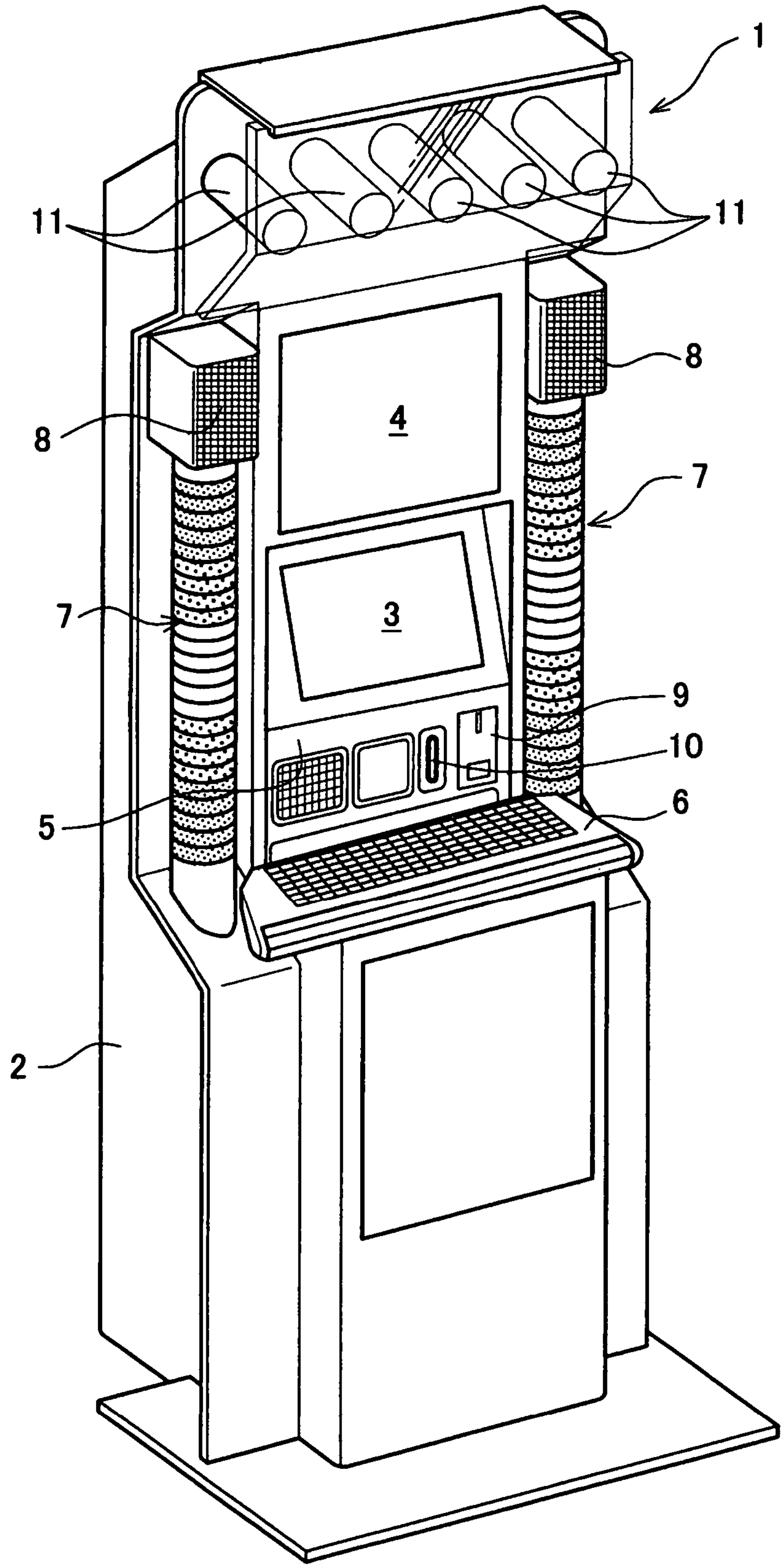
FIG. 1 is a perspective view of a typing game apparatus according to an embodiment of the present invention.

In the following, the overall structure of a typing game apparatus according to this embodiment will be explained with reference to FIG. 1. FIG. 1 is a perspective view of this typing game apparatus according to the present embodiment.

As shown in FIG. 1, the typing game apparatus 1 according to this embodiment fundamentally comprises: a housing 2 which constitutes the outer casing of the typing game apparatus 1; a first liquid crystal display 3 on which a main game screen (refer to FIGS. 4B and 5B) is displayed; a second liquid crystal display 4 which is positioned above the first liquid crystal display 3, and on which images related to effects such as promotion videos or advertisements or the like (refer to FIGS. 4A and 5A) are displayed; a center panel 5 which is provided below the first liquid crystal display 3, and in which insertion slots for coins and cards are formed; a keyboard 6 on which the player performs typing; illumination devices 7 which are provided to the left and the right of the first liquid crystal display 3, a pair of speakers 8 which are provided to the left and the right of the second liquid crystal display 4, five spotlights 11 which are arranged above the second liquid crystal display 4, and the like. Each of these structural elements will now be explained.

The first liquid crystal display 3 is a liquid crystal display which is provided approximately at the central portion of the front surface of the housing 2 and which is disposed at a predetermined angular inclination, and it is arranged to incline rearward from the front surface at a predetermined angle.

And display is performed (refer to FIG. 4B and FIG. 5B) on this first liquid crystal display 3 of the lyrics of a song which is reproduced via the speakers 8 during the execution of the typing game, of the results of typing by the player, and of playing information related to the progression of the typing game (information which the player needs during the progression of the game) such as the score obtained and the like.

On the other hand, the second liquid crystal display 4 which is provided separately above the first liquid crystal display 3 is a liquid crystal display of the same type as the first liquid crystal display 3, and, during execution of a typing game, effect images related to effects for the typing game are displayed on this second liquid crystal display 4.

Here, the contents of the effect images displayed on the second liquid crystal display 4 are different from those which are displayed on the above described first liquid crystal display 3, and, while they are not directly required by the player to progress in the game, they fulfill a support role in order to reach the climax of the typing game. For example as, with the typing game apparatus 1 according to this embodiment, a song by a vocalist is reproduced as the song, and the game progresses by the player performing input of the lyrics of the song via the keyboard 6, meanwhile a promotion video (hereinafter abbreviated as a "PV") related to this song is displayed on the second liquid crystal display 4 (refer to FIGS. 4A and 5A). Accordingly, it becomes possible to present the typing game in a manner in which, along with the song being played, a presence is projected of the figure of the artist singing, so that the player does not become bored.

Furthermore, after the game has terminated, a game result screen 30 which shows the result of this current typing game is displayed on the first liquid crystal display 3 (refer to FIG. 6B), while on the other hand a lyrics results display screen 35 (refer to FIG. 6A) whose display state is made to vary based on a correctness determination result for the typing of the title or the lyrics or the like of the song used for the current typing game is displayed on the second liquid crystal display 4. It should be understood that the contents of the displays provided on the first liquid crystal display 3 and on the second liquid crystal display 4 will be explained in detail hereinafter.

Furthermore, a coin insertion slot 9 and a card insertion slot 10 are provided on the center panel 5.

The coin insertion slot 9 is an insertion slot in which a coin such as a 100 yen coin or the like is inserted. A coin sensor 63 is provided to this coin insertion slot 9, and, when a coin is inserted into the coin insertion slot 9, a coin detection signal is outputted via the coin sensor 63 to a CPU 51 (refer to FIG. 10), so that a CPU 51 detects that a coin has been inserted.

Furthermore, the card insertion slot 10 is an insertion slot for the insertion of an IC card (not shown in the figure) bearing an IC tag on which a game result for the typing game is recorded. In the interior of this card insertion slot 10, there are disposed a card sensor 64 and a card reader-writer 65 which will be described hereinafter (refer to FIG. 10), and, when an IC card is inserted in the card insertion slot 10, this fact is detected by the card sensor 64. Here, the IC card which is used in the typing game apparatus 1 according to this embodiment is a card which stores the game results (the score acquired and the points and so on) for the previous games of the player up to and through the previous one, which are kept in the incorporated IC tag, so that these stored game results can be displayed to the player by his performing a predetermined operation.

Figure 13:
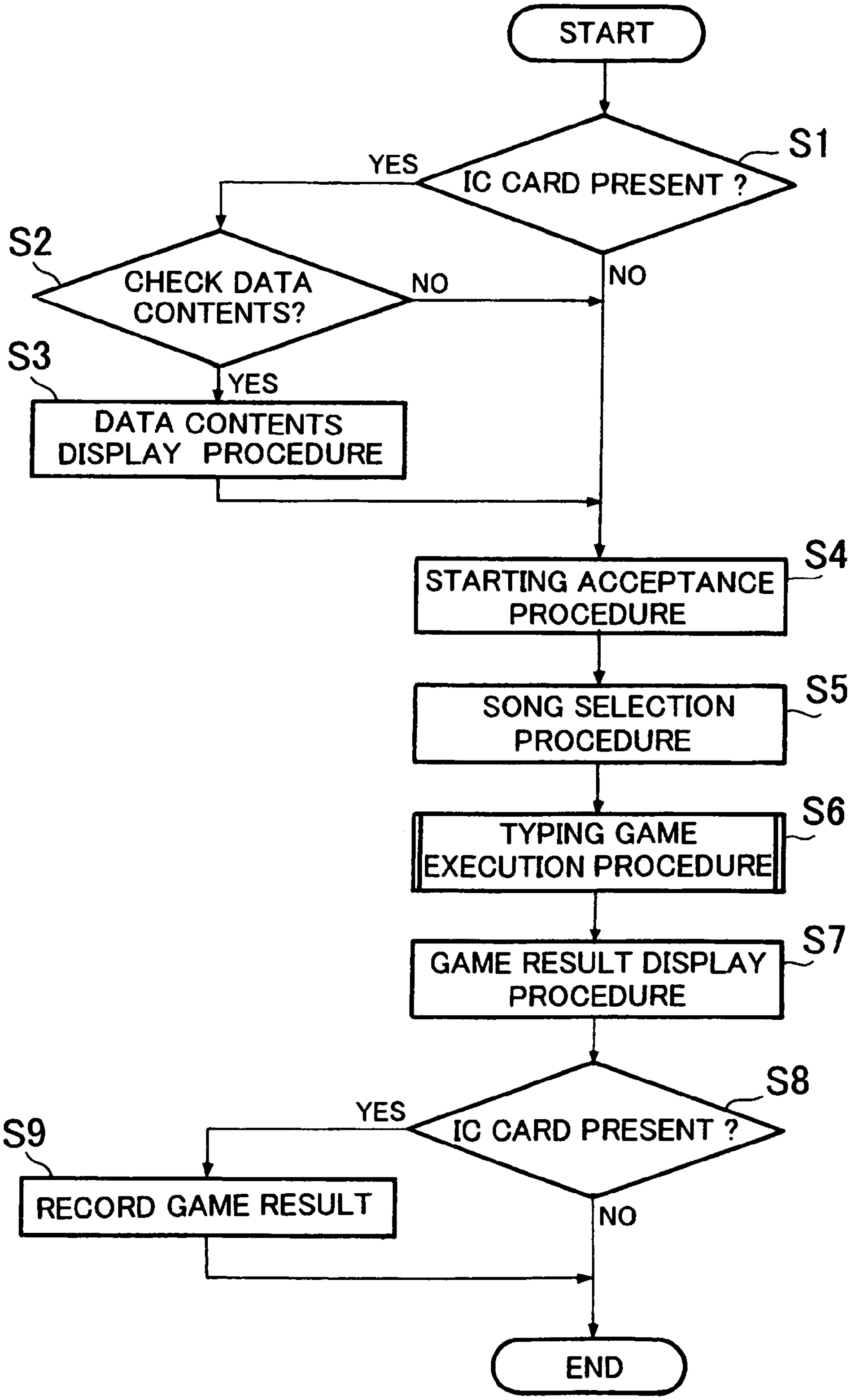
FIG. 13 is a flow chart showing the flow of a main processing program of the typing game apparatus according to this embodiment.

In other words, if an IC card has been detected by the card sensor 64, the card reader-writer 65 reads out the results of typing games from the IC tag, or writes in new game results to the IC tag, or the like (in steps S3 and S9 of FIG. 13).

Furthermore, the keyboard 6 is a 108 key keyboard (refer to FIG. 7), which is disposed so as to project forward from the front surface of the housing 2, and on which, as will be described hereinafter, there are arrayed a plurality of character input keys which perform input of Alphabet letters (A through Z), digits (0 through 9), punctuation symbols (period and comma), and so on, and function keys such as an enter key, cursor keys, and so on. And, during the game, the player makes progress in the game by performing character input by typing various keys which correspond to characters, symbols, digits, and the like, and also, before the start of play or after the end of play, based on the actuation of various keys, he performs selection of the song for which to perform the game and determination of the difficulty level of the game, and issue of a command to start the execution of a game and so on.

It should be understood that the structure of the keyboard will be described in detail hereinafter.

Furthermore, a pair of illumination devices 7 are disposed on each of the left and right side surfaces of the housing 2. The external appearance of these illumination devices 7 is that they consist of circular tubular translucent members which are configured with a maximum of 24 ring shaped light emitting bodies (hereinafter termed “light emitting rings”) extending in the horizontal direction being laid on one another in the vertical direction; and furthermore, in the interior of each of these illumination devices 7, there are provided a maximum of 24 full color LEDs which can be lit up in full color, arranged in a line at equal intervals in the vertical direction, so that a large number of different illumination effects can be created according to the song which is reproduced by the typing game apparatus 1, with these illumination effects being provided according to the way in which the player types. For example, as such illumination effects, it is possible to provide an effect of changing the positions or the illumination colors of the light emitting rings, an effect of making changes to the positions or the illumination colors of the light emitting rings according to a fixed rule, an effect of turning the light emitting rings on and off, or the like.

Furthermore, speakers 8 are provided on the left and right sides of the second liquid crystal display 4. These speakers 8 are output devices which output the song which is reproduced by the typing game apparatus 1 (which consists of the combination of its accompaniment music and the voice of its artist), or effect sounds or the like. In concrete terms, during the execution of the typing game, the accompaniment music and the voice of the artist who is singing are outputted at a specified tempo, based on the voice data and the musical accompaniment data for the song which are stored in a HDD 55 (refer to FIG. 11).

Figure 2:
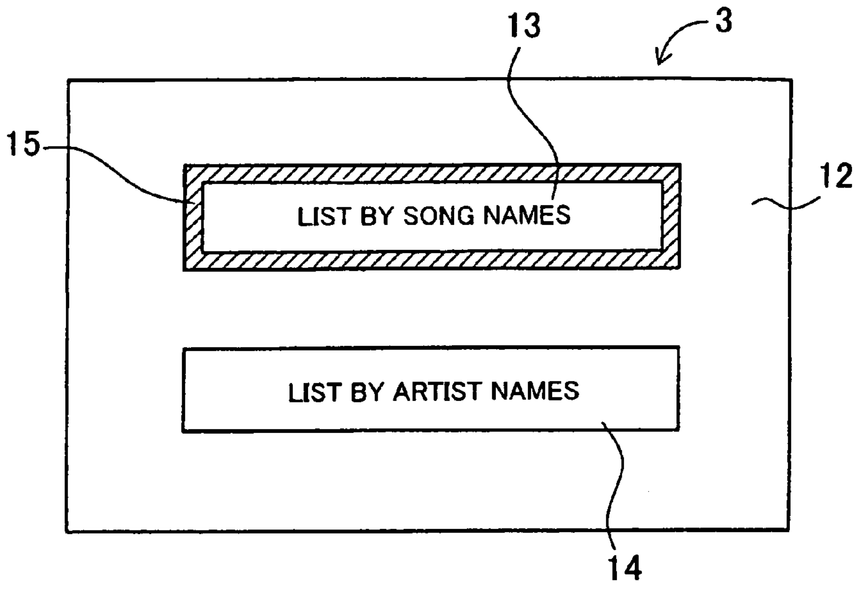
FIG. 2 is a schematic figure showing a search mode selection screen which is displayed on a first liquid crystal display before the start of a typing game.
Figure 3:
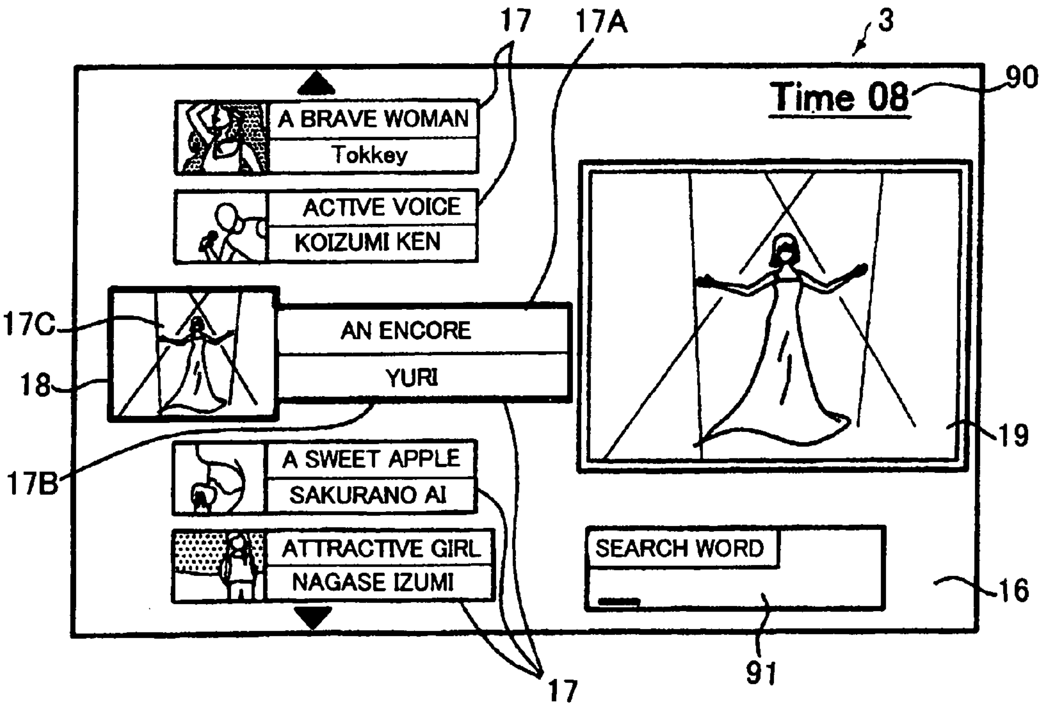
FIG. 3 is a schematic figure showing a song selection screen which is displayed on the first liquid crystal display before the start of the typing game.
Figure 4A:
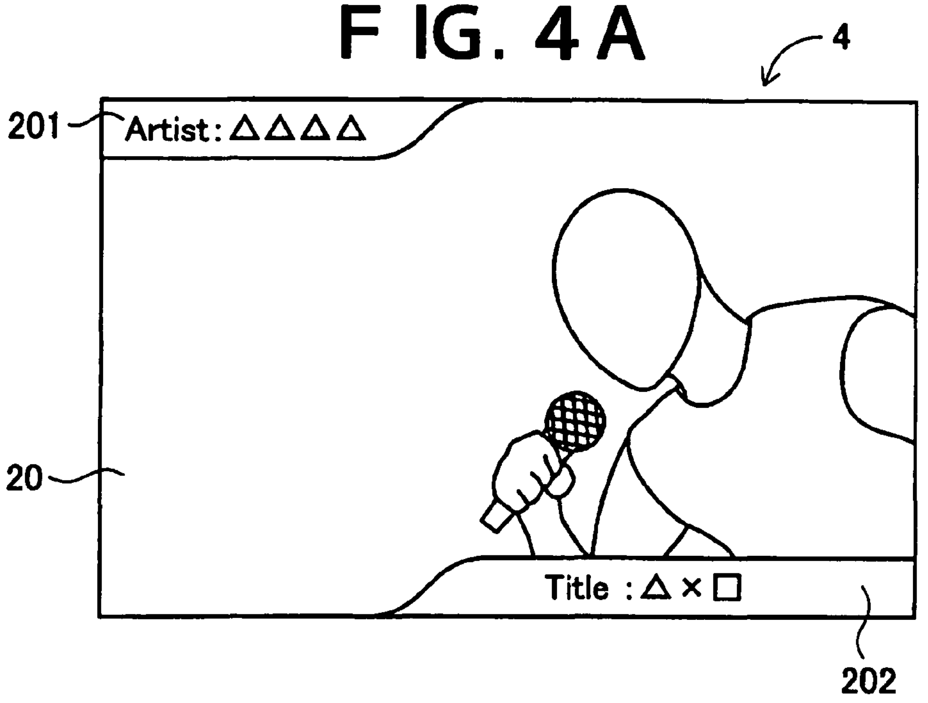
FIG. 4A is a schematic figure showing the contents displayed on a second liquid crystal display during the progression of the typing game.
Figure 4B:
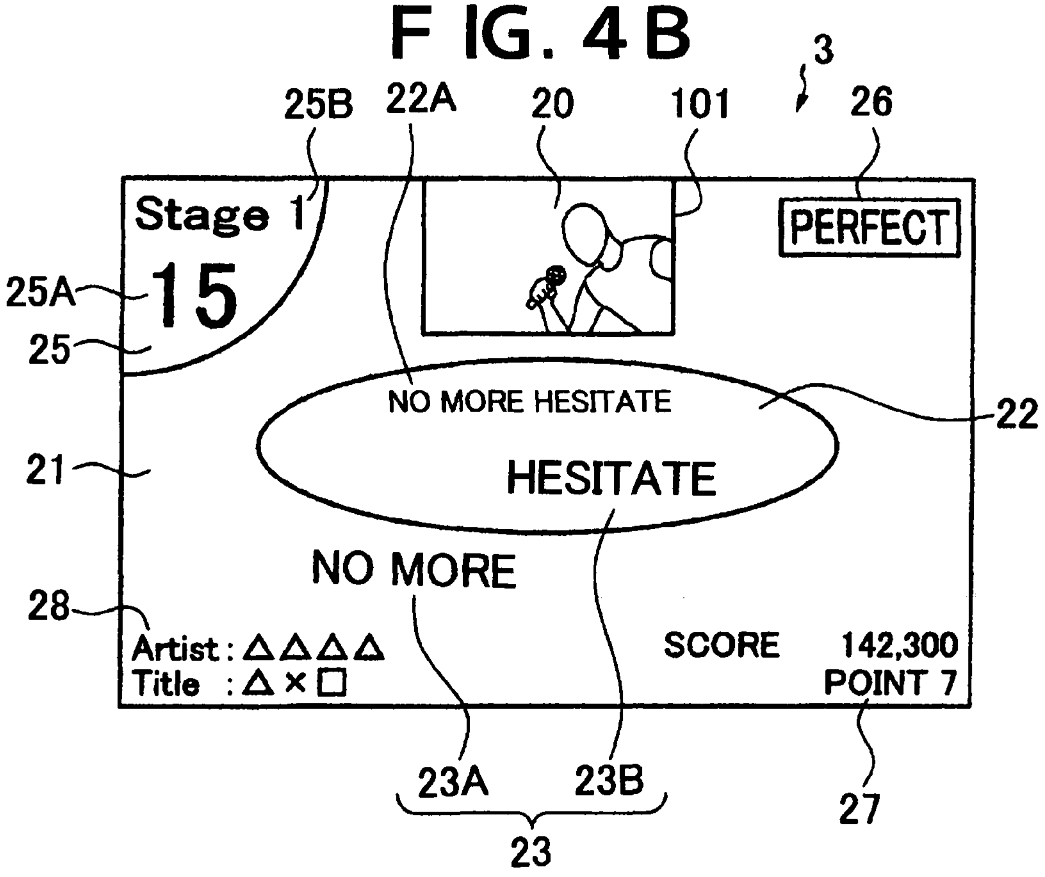
FIG. 4B is a schematic figure showing contents displayed on the first liquid crystal display during the progression of the typing game.
Figure 5A:
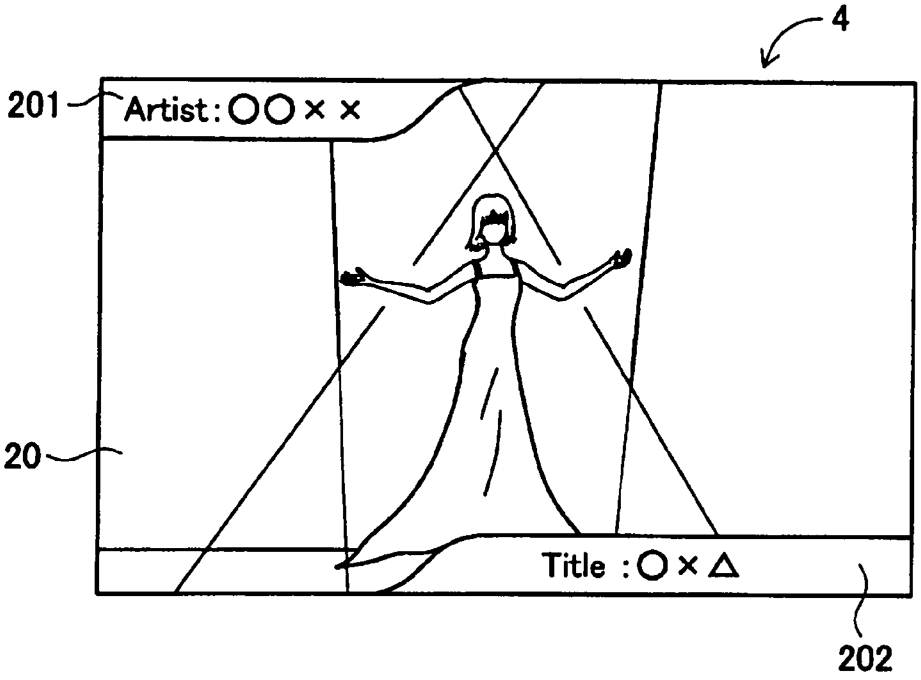
FIG. 5A is a schematic figure showing contents displayed on the second liquid crystal display during the progression of the typing game.
Figure 5B:
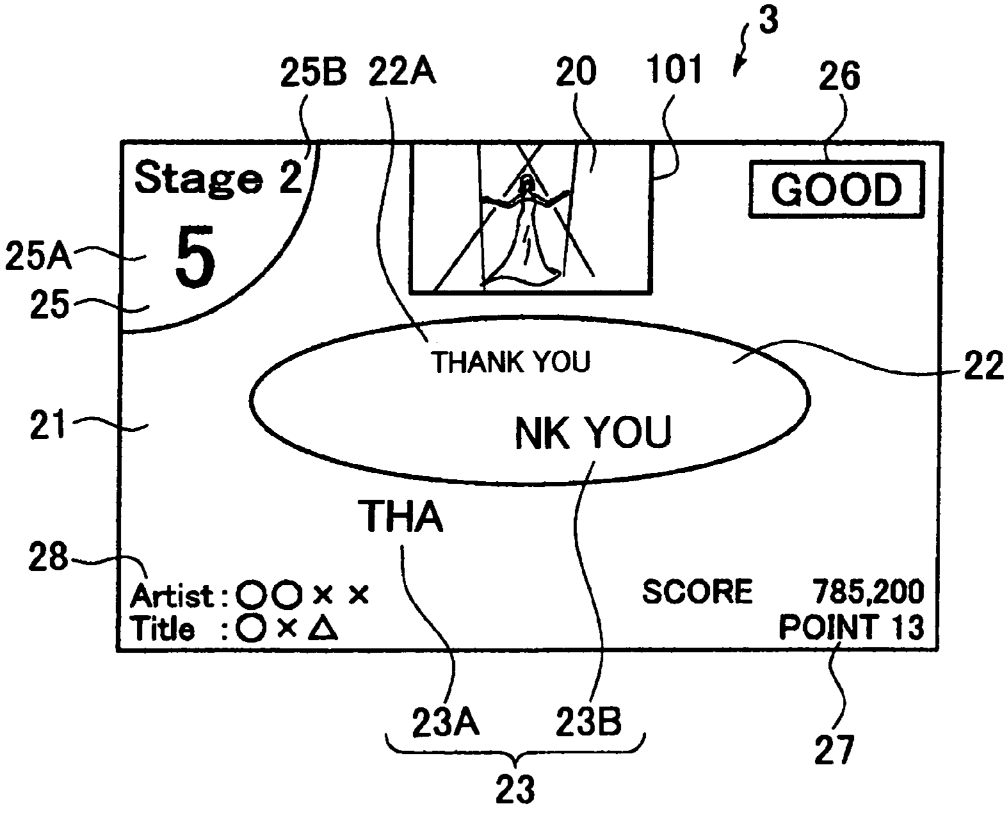
FIG. 5B is a schematic figure showing contents displayed on the first liquid crystal display during the progression of the typing game.
Figure 6A:
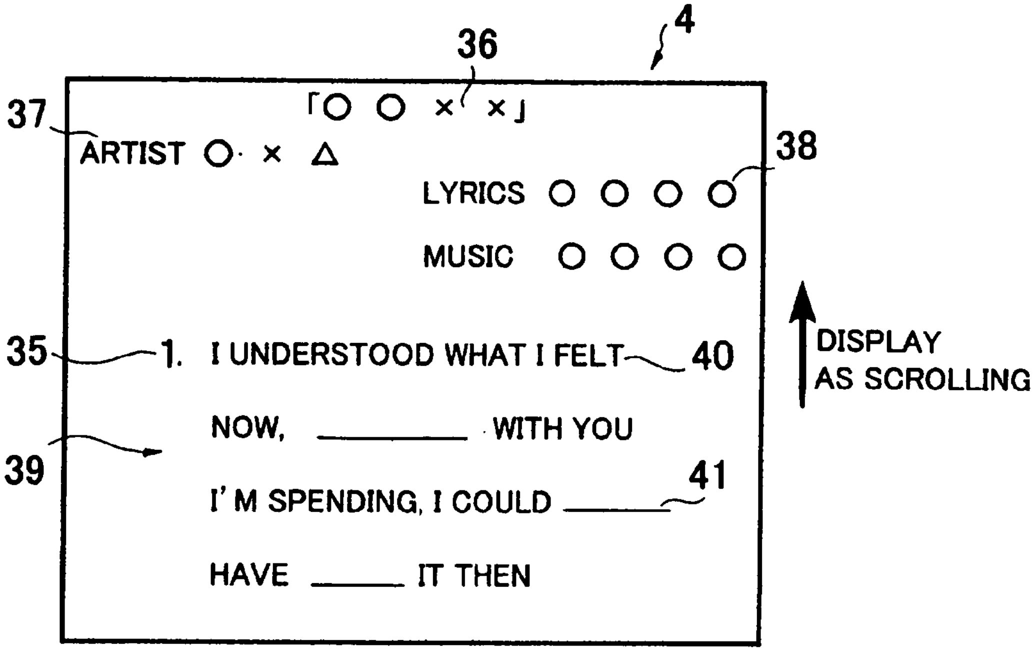
FIG. 6A is a schematic figure showing contents displayed on the second liquid crystal display after the typing game has terminated.
Figure 6B:
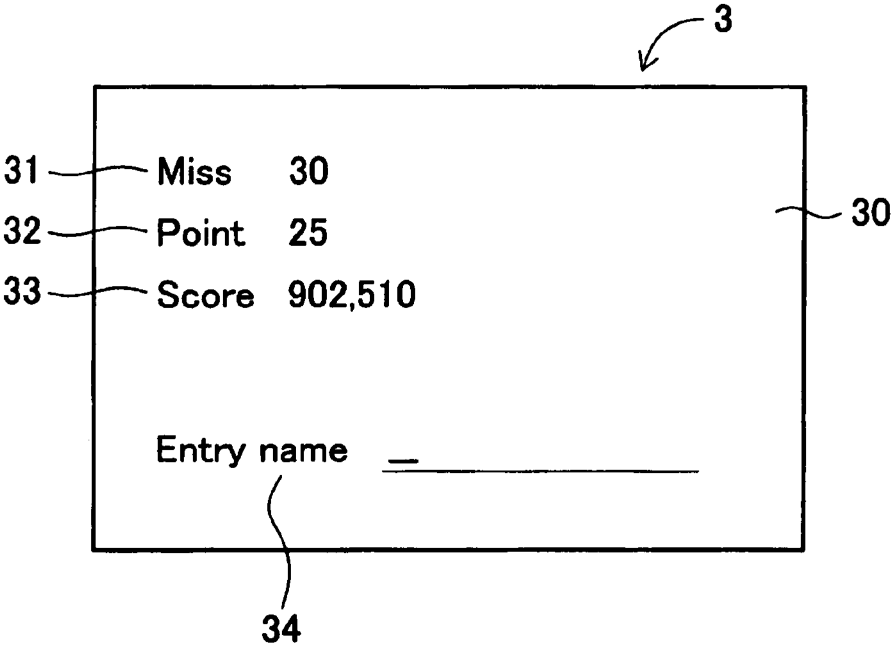
FIG. 6B is a schematic figure showing contents displayed on the first liquid crystal display after the typing game has terminated.

Next, the contents of the displays which are displayed on the first liquid crystal display 3 and the second liquid crystal display 4 will be explained in detail with reference to FIGS. 2 through 6. It should be understood that the contents of the displays which are displayed by the first liquid crystal display 3 and the second liquid crystal display 4 fundamentally consist of three patterns: one pattern before the start of the typing game, one pattern during the execution of the typing game, and one pattern after the end of the typing game. FIGS. 2 and 3 are schematic figures showing the details of displays which are displayed on the first liquid crystal display 3 before the start of the typing game; FIGS. 4A and 5A are schematic figures showing the details of displays which are displayed on the second liquid crystal display 4 during the execution of the typing game; FIGS. 4B and 5B are schematic figures showing the details of displays which are displayed on the first liquid crystal display 3 during the execution of the typing game; FIG. 6A is a schematic figure showing the details of a display which is displayed on the second liquid crystal display 4 after the end of the typing game; and FIG. 6B is a schematic figure showing the details of a display which is displayed on the first liquid crystal display 3 after the end of the typing game.

Thus, with the typing game apparatus 1 according to this embodiment, the typing game is performed by inputting the lyrics of a song which is played. In concrete terms, first, from among a plurality of songs which are made available, the player selects the song with which he desires to play. And, when the typing game starts, the musical accompaniment data corresponding to the accompaniment music of the song which has been selected and the voice data corresponding to the singing voice of the artist of that song are reproduced. Moreover, along with the reproduction of the musical accompaniment data and the voice data of the song, the lyrics of the song are displayed one phrase at a time as character strings which the player must input, together with the voice data which is reproduced.

The typing game progresses by the player inputting, via the keyboard 6, the character strings which correspond to these single phrases of the lyrics which are displayed, and, when play has terminated, based on various parameters related to the typing, such as the accuracy of the typing, the timing at which it has been inputted, and the like, the results of the typing game (the number of typing errors, the score acquired, the points and so on) are calculated and are displayed. In other words, the typing game on this typing game apparatus 1 is performed by the player competing in the degree of skill related to typing input during the game, while enjoying the song which is played during the game.

First, the contents of the display before the start of the typing game will be explained with reference to FIG. 2. After insertion of a coin or coins to a predetermined monetary value into the coin insertion slot 9, first, before the start of the typing game, on the first liquid crystal display 3, there is displayed a difficulty level setting screen (not shown in the figures), on which the player selects a difficulty level for the game from among “Easy”, “Normal”, or “Hard”. Thereafter, since selection of the song to be played is to be performed by the player, at this time, as shown in FIG. 2, a search mode selection screen 12 is displayed, on which he selects whether to display a list of the songs which can be played based on the names of songs as ordered by Alphabet letters “A” through “Z”, or to provide the display based on the names of artists as ordered by Alphabet letters “A” through “Z”.

This search mode selection screen 12 consists of a list by song names selection section 13 in which “list by song names” is displayed, a list by artist names selection section 14 in which “list by artist names” is displayed, and a mode selection cursor 15 which can select either the list by song names selection section 13 or the list by artist names selection section 14.

By actuating cursor keys 114 on the keyboard 6 (refer to FIG. 7), the player shifts the mode selection cursor 15 upwards or downwards to the list by song names selection section 13 or the list by artist names selection section 14, and, when the mode selection cursor 15 is positioned over the selection section in which is displayed the music display ordering which he desires, he presses an enter key 112 (refer to FIG. 7), and thereby determines the display ordering when selecting a song; and then, as shown in FIG. 3, based on the display ordering which has thus been determined, there is displayed a song selection screen 16 which gives a list of the songs which can be played by this typing game apparatus 1.

Here, this song selection screen 16 comprises: song candidate display sections 17 in which are displayed the song names 17A which are registered in the typing game apparatus 1 and can be played, the names 17B of their artists, and images 17C from PVs of particularly appealing portions thereof; a song selection cursor 18 with which any one of the song candidate display sections 17 may be selected; a selected PV display section 19 in which is displayed the PV of a particularly appealing portion of the song which is selected by the song selection cursor 18; a selected time period display section 90; and a search character string display section 91.

Each of the song candidate display sections 17 is a section for showing the name and so on of one of five songs, among the songs which can currently be played on this typing game apparatus 1 (in this embodiment, a maximum of one hundred songs), and these sections 17 can be scrolled in the vertical direction by actuation of the cursor keys 114 (refer to FIG. 7) on the keyboard 6, so that it is possible to display the names and so on of all of the songs which are currently stored. Furthermore, the ordering of the display of these songs changes according to the search mode which is selected on the search mode selection screen 12: if "list by song names" is selected, then a list based on the names of the songs is displayed as ordered by Alphabet letters "A" through "Z"; while if "list by artist names" is selected, then a list based on the names of the artists is displayed as ordered by Alphabet letters "A" through "Z". Moreover, as described hereinafter, in the state in which the song selection screen 16 is displayed, it is possible to change the order of this display ordering (refer to FIGS. 17 and 18) by inputting a character string for searching using the character input keys 111 (refer to FIG. 7) of the keyboard 6.

Here, the songs which can be played by being displayed on the song selection screen 16 are songs for which the music data is stored on the HDD 55, as will be described hereinafter (refer to FIGS. 10 and 11), and moreover the music data which is stored is managed by a server 80 (refer to FIG. 9), and is periodically updated. Accordingly, it is possible for the player to perform playing by selecting from among a plurality of songs, including new songs which have been updated by the server 80.

Furthermore, the song selection cursor 18 is displayed around the one of the song candidate display sections 17 which is positioned in the center within the five song candidate display sections 17 which are displayed, and that song candidate display section 17 which has been selected by the song selection cursor 18 is shown in a size which is somewhat larger than that of the other song candidate display sections 17. And the PV of the particularly appealing portion of the song at whose song candidate display section 17 the song selection cursor 18 is currently positioned (in FIG. 3, the song whose name is "AN ENCORE" and whose artist name is "Yuri") is displayed in the selected PV display section 19, and furthermore this appealing song portion is outputted by the speakers 8.

Figure 7:
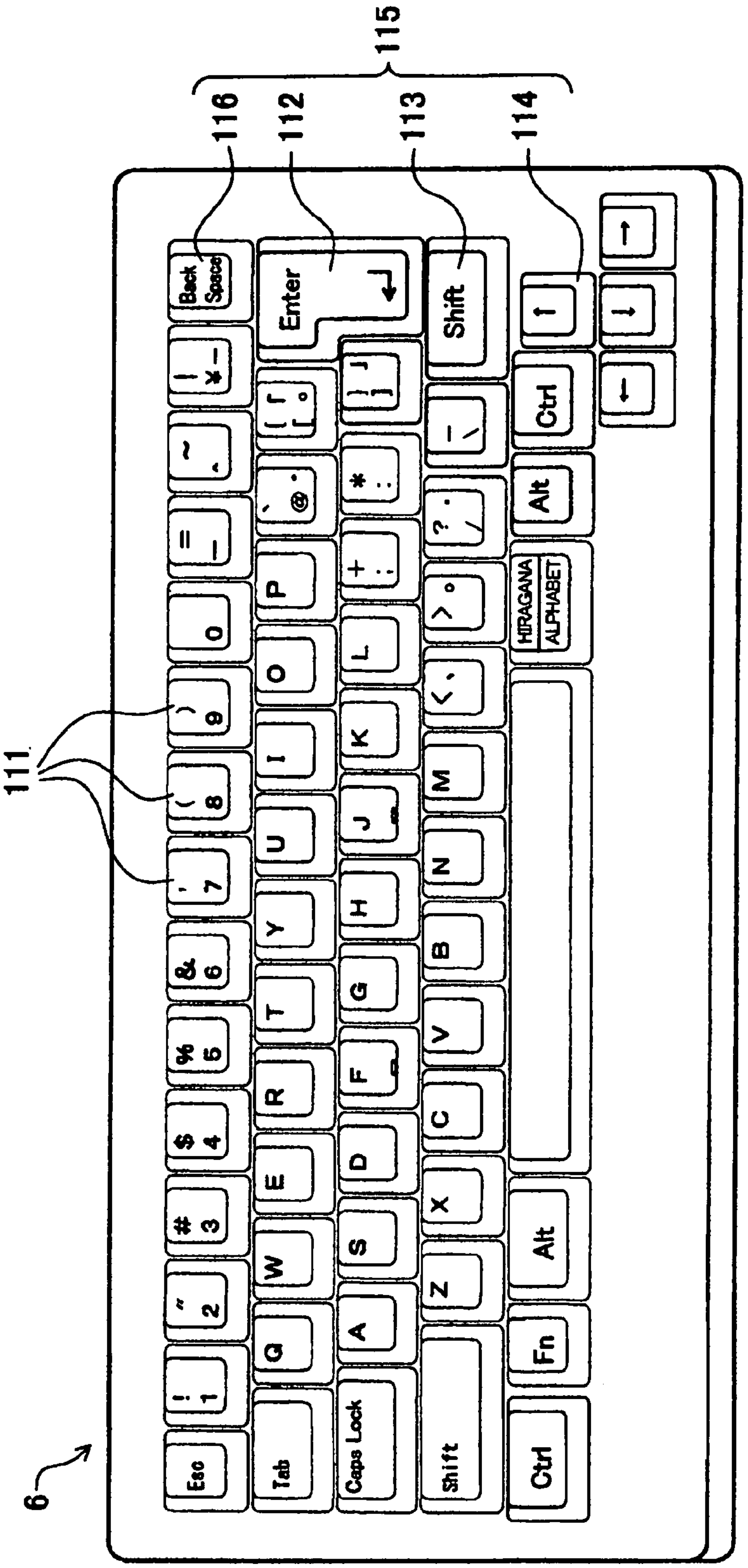
FIG. 7 is a plan view showing a keyboard which is provided to this typing game apparatus of this embodiment.

Moreover it is possible to change the song whose song candidate display section 17 is currently being selected by the song selection cursor 18 to another song, by scrolling the songs which are displayed in the song candidate display sections 17 in the vertical direction by operating the cursor keys 114 of the keyboard 6 (refer to FIG. 7).

And when the enter key 112 (refer to FIG. 7) is pressed in the state in which the song selection cursor 18 is positioned over that song candidate display section 17 in which the name of the desired song is displayed, then this song is determined as being the one for which the typing game is to be performed, and the game starts.

On the other hand, the selection time period display section 90 is a display section in which there is displayed to the player the elapsed time over which this song selection screen 16 has been displayed, and "20" is displayed herein directly after the system has shifted to the song selection screen 16, while this number is decremented by 1 for each second that elapses. And when "0" comes to be displayed, even without the enter key 112 being pressed, the song of that song candidate display section 17 which is selected at that time point by the song selection cursor 18 is determined as being the song for which the typing game will be performed, and the game starts.

Furthermore, the search character string display section 91 is a display section in which is displayed a character string which is inputted when performing a search for a song to be displayed in a song candidate display section 17 of the song selection screen 16. With the typing game apparatus 1 according to this embodiment, by inputting a character string for searching with the character input keys 111 of the keyboard 6 as will be described hereinafter, it is possible to extract one or a plurality of songs which correspond to that string from among the songs which can be played, and to display them in the song candidate display sections 17, thus displaying them in higher priority than the other songs, while changing the order in which these songs are displayed. By doing this, it becomes possible for the player to perform the selection of a song in a simple and easy and moreover quick manner. It should be understood that the process of searching for a song by inputting a character string for searching will be explained in detail hereinafter.

It should be understood that, while the search mode selection screen 12 and the song selection screen 16 are displayed on the first liquid crystal display 3, a PV of any desired song may be running on the second liquid crystal display 4. Furthermore, an image of an advertisement or the like may also be displayed. Yet further, it may be arranged to display the song selection screen 16, not on the first liquid crystal display 3, but rather on the second liquid crystal display 4.

Next, the contents of displays provided during the execution of the typing game will be explained with reference to FIGS. 4 and 5. FIGS. 4A and 4B are figures respectively showing the display contents of the first liquid crystal display 3 and the second liquid crystal display 4 when a predetermined song A by a male artist has been selected on the song selection screen 16 and the typing game has started, while FIGS. 5A and 5B relate to the case when a predetermined song B by a female artist has been selected on the song selection screen 16 and the typing game has started.

As shown in FIG. 4A, when for example the song A has been selected and the game has started, an image 20 of a PV of the male artist who sings the song A is displayed on the second liquid crystal display 4 while being musically accompanied via the speakers 8. On the other hand, as shown in FIG. 5A, when for example the song B has been selected and the game has started, an image 20 of a PV of the female artist who sings the song B is displayed on the second liquid crystal display 4 while being musically accompanied via the speakers 8.

It should be understood that, as shown in FIG. 4A and FIG. 5A, at the left upper edge of the second liquid crystal display 4 on which the image 20 of the PV is displayed, there is provided an artist name information display section 201, in which is displayed the name of the artist who is currently performing; while, at the right lower edge of the second liquid crystal display 4 on which the image 20 of the PV is displayed, there is provided a song name information display section 202, in which is displayed the name of the song which is currently being performed.

On the other hand, as shown in FIGS. 4B and 5B, in parallel with the display of the image 20 of the PV on the second liquid crystal display 4, a main game screen 21 which is related to the progression of the typing game is displayed on the first liquid crystal display 3.

Here, this main game screen 21 is made up from: a lyrics display section 22 which displays the lyrics of the phrase which is currently being performed in Japanese using Alphabet letters; an Alphabet letters display section 23 which displays also in Japanese using Alphabet letters the character string 23A which the player has inputted by typing on the keyboard 6; a song state display section 25 which displays to which number verse (i.e. to which stage), and moreover to which number phrase, counting from when this verse started, the phrase of the lyrics which is currently being displayed in the lyrics display section 22; a typing result display section 26 which displays the results of determination of correctness or incorrectness of the typing by the player; a score display section 27 which displays the score which the player has acquired up until the present moment and his points and the like; and a song information display section 28 in which are displayed the name of the artist and the name of the song which is currently being played.

The lyrics display section 22 is a display section on which is displayed a character string 22A which corresponds to a single phrase of the lyrics of the song which is currently being played, and the game progresses by the player typing this character string 22A which is displayed in the lyrics display section 22 on the keyboard 6. And if the player types the lyrics which are displayed correctly the score steadily adds up, whereas if he has inputted the lyrics incorrectly, no score is added, but rather the number of errors is increased by the number of input errors which he has additionally made. If within any verse (stage) making up the song, when its verse finishes, this number of typing errors reaches or exceeds a predetermined number, then the game terminates at that time point (refer to S61 of FIG. 16).

Furthermore, with the typing game apparatus according to this embodiment, within the character string 22A, character portions which are typed wrongly during the game, and character portions for which the input does not arrive in time during the time period over which the character string is displayed, are not displayed on a lyrics results display screen 35 which will be described hereinafter (refer to FIG. 6A).

One phrase of the lyrics of the song which is currently being performed is displayed on the Alphabet letters display section 23, just as with the lyrics display section 22, but here the same lyrics are displayed as written in Alphabet letters. Furthermore, the characters which the player has typed up until now may be notified to him by displaying, among the shown lyrics, that character string 23A which has already been typed by the player as shifted down into the next line, as compared with the character string 23B before typing.

Furthermore, the song state display section 25 displays in which verse is the phrase of the lyrics which is currently being displayed on the lyrics display section 22, and moreover to which number phrase it corresponds, counting from when the verse started. Here, the typing game according to this embodiment consists of a plurality of stages (for example, it may consist of first through third stages) corresponding to the number of verses in the song which is reproduced (for example, one song may be made up from 1 to 3 verses). For example, in FIG. 4B, it is shown that the fifteenth phrase of stage 1 (i.e. of verse 1) is currently being displayed. Furthermore, in FIG. 5B, it is shown that the fifth phrase of stage 2 (i.e. of verse 2) is currently being displayed.

And, each time the input of a single phrase is completed by the player, a numerical value 25A which indicates the number of this phrase is incremented by 1; and, each time the input during a single stage is completed, a numerical value 25B which indicates the stage number (the verse number) of this stage is incremented by 1. By doing this, it becomes possible to notify to the player the stage number (i.e. the verse number) at the present time, and the number of phrases for which typing has been completed up until the present time.

The typing result display section 26 is a display section which displays the results of determination of correctness or incorrectness of the typing by the player, and "PERFECT" is displayed when the correct characters have been typed (struck) at the same timing as the vocals of the song which is played. Furthermore, "GOOD" is displayed when the correct characters have been typed at a timing which is different from that of the vocals of the song which is played. On the other hand, "MISS" is displayed when the wrong characters have been typed, irrespective of their timing.

The acquired score display section 27 is a display section which displays the score and the points which have been acquired by the player up till now. Here, the score is added to by the player typing correctly according to the character string 22A which is displayed in the lyrics display section 22, and moreover the score is also added to if the corresponding characters have been typed at the same timing as the vocals of the song which is played. On the other hand, the points are added to one point at a time (S56 of FIG. 16), if the text for one phrase has all been inputted without making any typing errors.

And this score and these points are added up until the game is completed, and then, when the game ends, if an IC card has been inserted into the card insertion slot 10 of the center panel 5, this score and these points which have been acquired are stored on that IC card (S9 of FIG. 13).

Furthermore, the name of the song selected by the player at the start of the game, which is currently being played, and the name of its artist, are both displayed in the song information display section 28.

Moreover, in the main game screen 21 of the first liquid crystal display 3, as shown in FIG. 4B and FIG. 5B, an independent image region 101 is provided at its central upper portion. And the image in this independent image region 101 is displayed at the same timing as that of the image 20 of the PV which is displayed on the second liquid crystal display 4. It should be noted that although, in FIGS. 4B and 5B, this independent image region 101 is provided within the main game screen 21 in a separate region from the lyrics display section 22, the Alphabet letters display section 23, the song state display section 25, the typing result display section 26, the score display section 27, and the song information display section 28, it may also be provided as superimposed.

It should be understood that although, in this embodiment, it is arranged to display the main game screen 21 on the first liquid crystal display 3, and to display the image 20 of the PV on the second liquid crystal display 4, it would also be acceptable, in the opposite manner, to arrange to display the image 20 of the PV on the first liquid crystal display 3, and to display the main game screen 21 on the second liquid crystal display 4.

Furthermore although, in this embodiment, it is arranged to input the entire text for one phrase which has been displayed in the lyrics display section 22, it would also be acceptable to arrange for the game to progress by the player setting the game difficulty level selected when a coin is inserted; for example, if "Easy" has been selected, by typing only the character string which corresponds to a portion (one word or the like) of the lyrics for a single phrase. Furthermore, if "Hard" has been selected, it would be acceptable to arrange for the game to progress by the player typing the character string which corresponds to the lyrics only based on the song which is performed, without any character string being displayed in the lyrics display section 22.

Next, the details of the display after the typing game has terminated will be explained using FIG. 6. FIGS. 6A and 6B are figures showing the contents of the displays on the first liquid crystal display 3 and the second liquid crystal display 4 after the typing game has been completed.

As shown in FIGS. 6A and 6B, with this typing game apparatus 1 according to this embodiment, after the typing game has been completed, along with displaying the first liquid crystal display 3 a game result screen 30 which gives a list of the game results of the typing game this time on, the second liquid crystal display 4, there is displayed a lyrics results display screen 35 on which are displayed anew all the lyrics of the song which has been played in the typing game this time, i.e. all the character strings 22A which appeared in the lyrics display section 22 and which have been the object of typing by the player.

First, to explain this game result screen 30 which is displayed on the first liquid crystal display 3, it consists of an error number display section 31 on which the number of errors typed during the current typing game is displayed, an acquired point display section 32 on which the number of points acquired is displayed, an acquired score display section 33 on which the score acquired is displayed, and a name input display section 34 which invites input of the name of the player who has been playing.

And, by referring to this game result screen 30, the player is able to recognize each of the number of errors in the current typing game, the points which he has acquired, and the score which he has acquired. Furthermore, by inputting any desired name into the name input display section 34 by using the keyboard 6, he is able to record the score which he has acquired in a ranking list. It should be understood that a list of the rankings which have been recorded is displayed on the first liquid crystal display 3 or the second liquid crystal display 4 during a demo screen or the like.

On the other hand, to explain the lyrics results display screen 35 which is displayed on the second liquid crystal display 4 together with the game result screen 30, this lyrics results display screen 35 consists of: a lyrics song name display section 36 in which is displayed the name of the song which is selected on the song selection screen 16 (refer to FIG. 3) and which has been played during the execution of the typing game; a lyrics artist name display section 37 in which the name of the artist of the song is displayed; a lyrics author and music author display section 38 in which the name of the author of the lyrics and the name of the author of the music are displayed; and a lyrics results display section 39 in which are displayed the lyrics of the song (the character strings 22A which are displayed in the lyrics display section 22 of the main game screen 21, and which are the object of typing by the player).

Furthermore, this lyrics results display screen 35 is scrolled at a predetermined speed in the upwards direction, in order to display all of the lyrics of the song on the lyrics results display section 39. And, after display of all of the lyrics has been completed, the lyrics results display screen 35 is cancelled, and at the same time the first liquid crystal display 3 is changed over from the game result screen 30 to a game terminated screen (not shown in the figures). The characters "Game Over" are displayed on this game terminated screen, so as to inform the player of the fact that this current game has been finished.

Next, the lyrics which are displayed in the lyrics results display section 39 will be explained. Here, with regard to the lyrics of the song which are displayed in the lyrics results display section 39, the lyrics of all the verses are displayed one phrase at a time, each in its own line, and furthermore there are two display formats for them. In concrete terms, one of these display formats is a normal character string 40 which displays the character strings which correspond to these lyrics in a normal font (for example in a Gothic font with white characters), while the other such display format is a underlined portion 41 which displays underlining instead of these character strings which correspond to the lyrics.

Here, in which display format the lyrics of the song on the lyrics results display screen 35 are displayed, i.e. whether they are displayed by a normal character string 40 or an underlining portion 41, is determined based on the correctness or incorrectness determination results of the typing during the typing game. In other words, among the character strings which are displayed on the lyrics display section 22 of the main game screen 21, those character strings which have been typed correctly are displayed on the lyrics results display screen 35 as normal character strings 40. On the other hand, for those character strings which the player has not been able to type correctly, the actual details of the characters thereof are not displayed on the lyrics results display screen 35, but rather they are displayed after having been replaced by underlining portions 41. It should be understood that here, that a character string has been typed correctly, has no relationship with whether or not it has been typed at a timing which matches that of the voice of the song which is played; rather, a character string is determined as being one which has been typed correctly, if characters have been typed which correspond to those which are displayed when displaying the character string 22A in the lyrics display section 22.

If for example, as shown in FIG. 6A, the player cannot correctly type the character string of the second line "this time" within "now, this time with you", which is the character string for the second phrase of verse 1 of the specified song, then it is arranged not to display the portion "this time", but instead to replace it by an underlining portion 41, so that only the portions "now" and "with you" are displayed as normal character strings 40.

Accordingly, with the typing game apparatus 1 according to this embodiment, when the typing game has been concluded, along with displaying the entire lyrics of the song which is used in the typing game again, the portions of the character strings which the player is not able to type correctly while the typing game is executed are displayed in a display format which is different from the one for the character strings which he is able to type correctly, so that the player is enabled visually to recognize the spots at which he has made typing mistakes, and the spots at which he has not been able to perform typing at all, in a simple and easy manner. Furthermore, he is imparted with a desire to play the game again, since he is enabled, in a simple and easy manner, to determine those character strings which are his weak points when typing, among the large number of character strings which come to be inputted during the typing game. Yet further, by causing the lyrics of the song which is used for the typing to be displayed again on the display after the game has been completed, it is possible to enhance the beneficial effect for publicity of the song with regard to the customers surrounding the player.

It should be understood that the display format, in which the character strings which the player has not been able to type correctly are displayed to him, is not limited to displaying them by the underlined portion 41; any display format will be acceptable, provided that it is different from the one which enables the player to recognize the character strings which he has been able to type correctly.

Furthermore although, in this embodiment, it is arranged to display the game result screen 30 which gives the result of the game on the first liquid crystal display 3, and to display the lyrics results display screen 35 which gives the lyrics of the song which has been played on the second liquid crystal display 4, it would also be acceptable to arrange to display both the result of the game and the lyrics of the song at the same time on one or the other of the first liquid crystal display 3 and the second liquid crystal display 4.

Next, the keyboard 6 which is provided to this typing game apparatus 1 will be explained with reference to FIG. 7 and FIG. 8. FIG. 7 is a plan view showing the keyboard which is provided to the typing game apparatus according to this embodiment. And FIG. 8 is a schematic sectional view showing, in cross section, one of a plurality of keys which are provided to this keyboard.

As shown in FIG. 7, the keyboard 6 is a 108 key keyboard on which there are arrayed a plurality of character input keys 111 which perform input of Alphabet letters (A to Z), digits (0 to 9), punctuation symbols (period and comma) and the like, and various function keys 115 such as an enter key 112, a shift key 113, cursor keys 114, a backspace key 116, and the like. And, during play, the player progresses through the game by performing character input by typing the character input keys 111 corresponding to characters, punctuation marks, digits and the like. On the other hand, before the start of play and after the end of play and the like, based on actuation of the function keys 115, he issues commands to determine on the songs with which to perform the game, to select a level of difficulty for the game, to start the execution of the game, and the like. Moreover, in the situation in which the song selection screen 16 is displayed, he performs searching for a song with a character string using the character input keys 111 and a backspace key 116. Furthermore, illumination LEDs are provided in the interiors of various keys on the keyboard 6, so that, based on control signals from the CPU 51, the keys may be illuminated in various ways.

Now, the structure of the interiors of the keys of the keyboard 6 will be explained based on FIG. 8. It should be understood that all of the plurality of keys which are arranged on the keyboard 6 have similar interior structures. Accordingly, in the following, the interior construction of one of the character input keys 111 among the plurality of keys which are arranged on the keyboard 6 will be explained by way of example, and explanation of the structure of the other character input keys 111, and of the function keys 115, will be curtailed.

Figure 8:
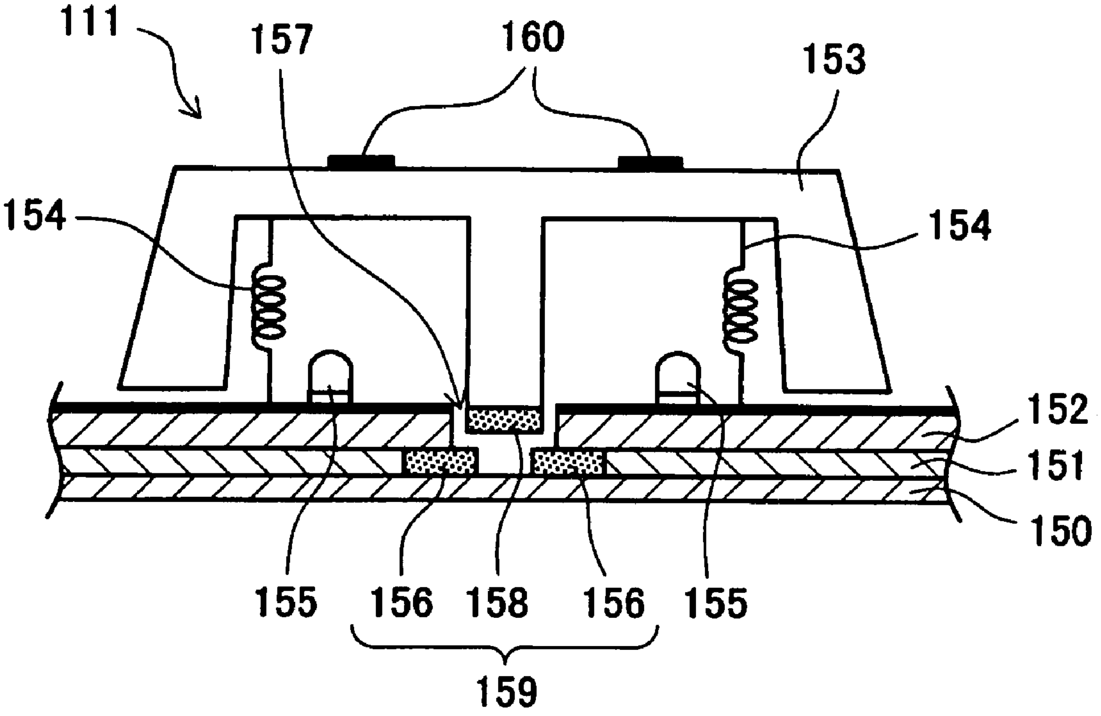
FIG. 8 is a schematic sectional view taken through one of a plurality of keys which are provided on the keyboard.

As shown in FIG. 8, this character input key 111 fundamentally comprises a base plate 150, a switch circuit board 151, a illumination circuit board 152, a keytop 153, biasing mechanisms 154, full color LEDs 155, and the like.

In particular, on the switch circuit board 151 which is laid over the base plate 150, there are provided a pair of electrodes 156 which are disposed directly underneath the vicinity of the center of the keytop 153.

Furthermore, an opening portion 157 for exposing the above described pair of electrodes 156 is provided on the illumination circuit board 152 which is laid over the switch circuit board 151, and full color LEDs 155, which can be illuminated in full color, are provided around the circumference of this opening portion 157.

Moreover, the biasing mechanisms 154 are provided between the illumination circuit board 152 and the keytop 153, and the keytop 153 is returned to the opposite side against the switch circuit board 151 by these biasing mechanisms 154. Furthermore, an electrode 158 is provided in the vicinity of the center of the keytop 153, so as to project towards the switch circuit board 151. Accordingly since, when the keytop 153 is actuated by being pressed downwards, the electrode 158 which is provided so as to project from the keytop 153 is able to contact against the pair of electrodes 156 which are provided on the switch circuit board 151, therefore the fact that the keytop 153 has been actuated by being depressed can be transmitted as an electrical signal which flows in the switch circuit board 151. In other words, a key switch 159 is constituted by these three electrodes 156 and 158.

It should be understood that the biasing mechanisms 154 may be made as simple elastic bodies, or may be made as elastic bodies with linking mechanisms; they may be of any appropriate structure.

Furthermore, the keytop 153 may be made from any material which has the property of being translucent to light (for example, from translucent acrylic or translucent plastic or the like), and key information 160 such as a character, a digit, a symbol or the like may be printed on its planar top surface in black color. Moreover, the surface of the illumination circuit board 152 facing towards the keytop 153 may also be printed in black color.

Accordingly, while the full color LEDs 155 are turned off, the translucent keytop 153 appears in black color, which is the color of the surface of the illumination circuit board 152, so that it becomes difficult to recognize the key information 160 which is printed in black color, against this keytop 153 which appears in the same black color.

On the other hand since, when the full color LEDs 155 are turned on, the translucent keytop 153 appears in the color in which the full color LEDs 155 are illuminated, accordingly it becomes easy to recognize the key information 160 which is printed in black color, on this keytop 153 which appears in color.

And, in the keyboard 6, the various key switches 159 in the interiors of the keys are connected to a signal generation circuit not shown in the figures. This signal generation circuit is connected to the CPU 51 of the typing game apparatus 1 via an interface unit 52 (subsequently termed an I/O) which will be described hereinafter. Accordingly, by transmitting an electrical signal from the key switch 159 of the depressed key via this signal generation circuit to the CPU 51, specifying the key which has been actuated by pressing, it is possible to specify the type of the key which has been actuated by being pressed. It should be understood that this signal generation circuit is mounted on the above described switch circuit board 151.

Furthermore, in the keyboard 6, the full color LEDs 155 interior to the keys are connected to an illumination control circuit 62. Moreover, the illumination control circuit 62 is connected via the I/O 52 to the CPU 51 (refer to FIG. 10). Accordingly, via this illumination control circuit 62, it is possible to turn these full color LEDs 155 interior to the keys on according to the colors which have been specified by the CPU 51. In concrete terms, with this typing game apparatus 1 according to this embodiment, during the typing game, if it has been determined that key input has occurred, and moreover that correct typing has been performed, then the character input key 111 which has been depressed is illuminated in blue color. Furthermore, if it has been determined that key input has occurred, but that incorrect typing has been performed, then the character input key 111 which has been depressed is illuminated in red color, while the correct key which should have been inputted is illuminated in green color. Moreover, if no key input has taken place, then only the correct key which should have been inputted is illuminated in green color.

Figure 9:
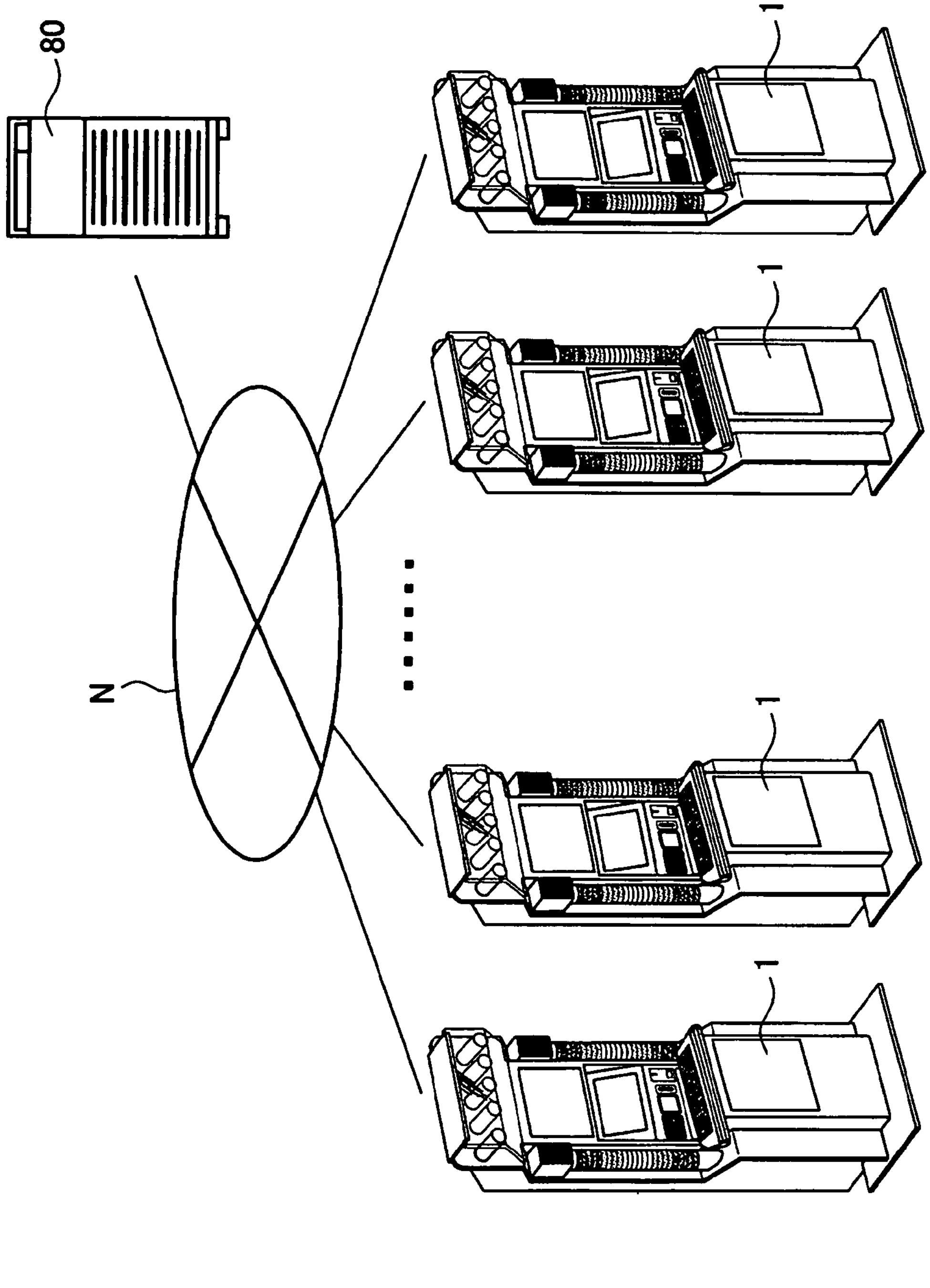
FIG. 9 is a system block diagram showing a system which consists of a server and a typing game apparatus according to this embodiment.

It should be understood that, as shown in FIG. 9, the typing game apparatus 1 according to this embodiment is connected to a server 80 via a network N, such as the internet or the like, which is capable of bi-directional communication. And, based on data transmitted from the server 80, the music data stored on the HDD 55 (refer to FIG. 11) of the typing game apparatus 1 can be updated.

Accordingly it is made possible, by updating the music data, to change the type of songs which can be played on the typing game apparatus 1, and furthermore, by managing several typing game apparatus which are set up in several game arcades all together, this data updating task becomes simple and easy.

Figure 10:
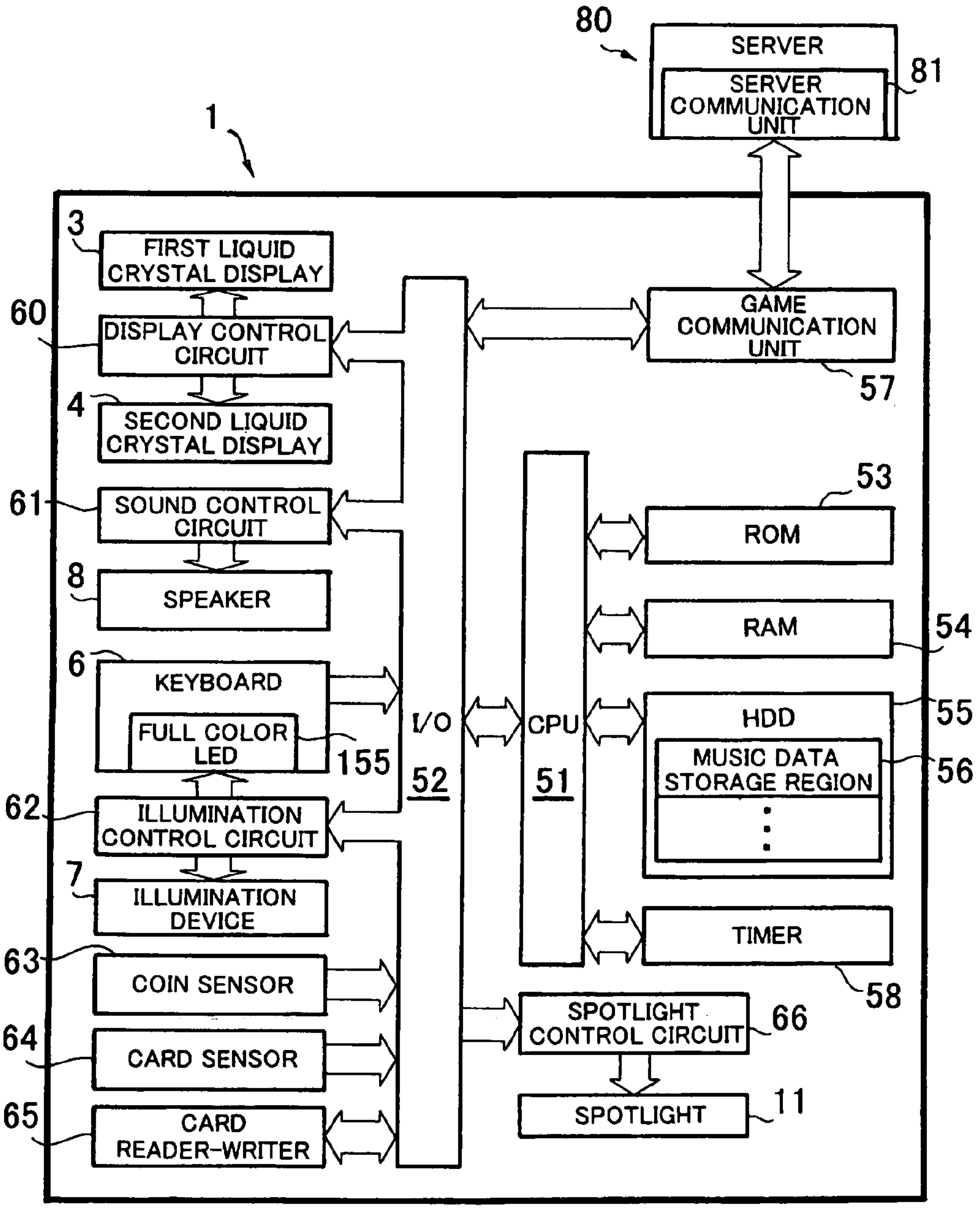
FIG. 10 is a block diagram, schematically showing a control system of the typing game apparatus according to this embodiment.

Next, structures related to the control system for this typing game apparatus 1 will be explained based on FIG. 10. FIG. 10 is a schematic block diagram showing the control system for the typing game apparatus according to this embodiment.

As shown in FIG. 10, the control system for the typing game apparatus 1 comprises a CPU 51 which oversees the various types of control for the typing game apparatus 1 such as play processing operation and the like, a ROM 53 and a RAM 54 which are connected to the CPU 51, and peripheral devices (actuators) which are electrically connected to this CPU 51 and the like.

The CPU 51 is a central calculation processing device which performs calculation processing according to various types of commands. The I/O 52 is a connection unit which directly and/or indirectly electrically connects the first liquid crystal display 3, the second liquid crystal display 4, the keyboard 6, the illumination devices 7, the speakers 8, the spotlights 11, and so on with the CPU 51.

The ROM 53 is a dedicated non-volatile read out only memory, in which is stored a calculation program for the operation of a flow chart which will be described hereinafter.

Furthermore, the RAM 54 is a memory which temporarily stores various types of data which have been calculated by the CPU 51, and it stores the number of typing errors made by the player during the typing game, the score which he has acquired, the points which he has acquired, and also a display sequence setting table 67 (refer to FIG. 12) in which a display ordering for the song which is displayed on the song selection screen 16 (refer to FIG. 3) is set, and so on. Furthermore, the lyrics data of that music data which, among the plurality of music data stored on the HDD 55 which will be described hereinafter, are used in the current typing game, are temporarily stored in the RAM 54, divided up into single phrases.

The HDD 55 is a storage device on which are stored music data used during the execution of the typing game by the typing game apparatus 1. Here, the music data consists of image data, musical accompaniment data, voice data, lyrics data, determination standard data, pattern data for LED illumination, pattern data for keyboard illumination, and time limit data, and these are stored in individual storage regions of a music data storage region 56 which is formed on the HDD 55 (refer to FIG. 11).

Yet further, in the music data storage region 56, there are stored the data for a plurality of songs (in this embodiment, for a maximum of a hundred songs), and these music data items which are stored are updated whenever required, based on data transmitted from the server 80 as described above. And the types of song names displayed on the song selection screen 16 (refer to FIG. 3) change based on the types of music data stored in the music data storage region 56, and the typing game is performed based on the music data corresponding to the song which has been selected on the song selection screen 16 (refer to FIG. 4B and FIG. 5B).

Figure 11:
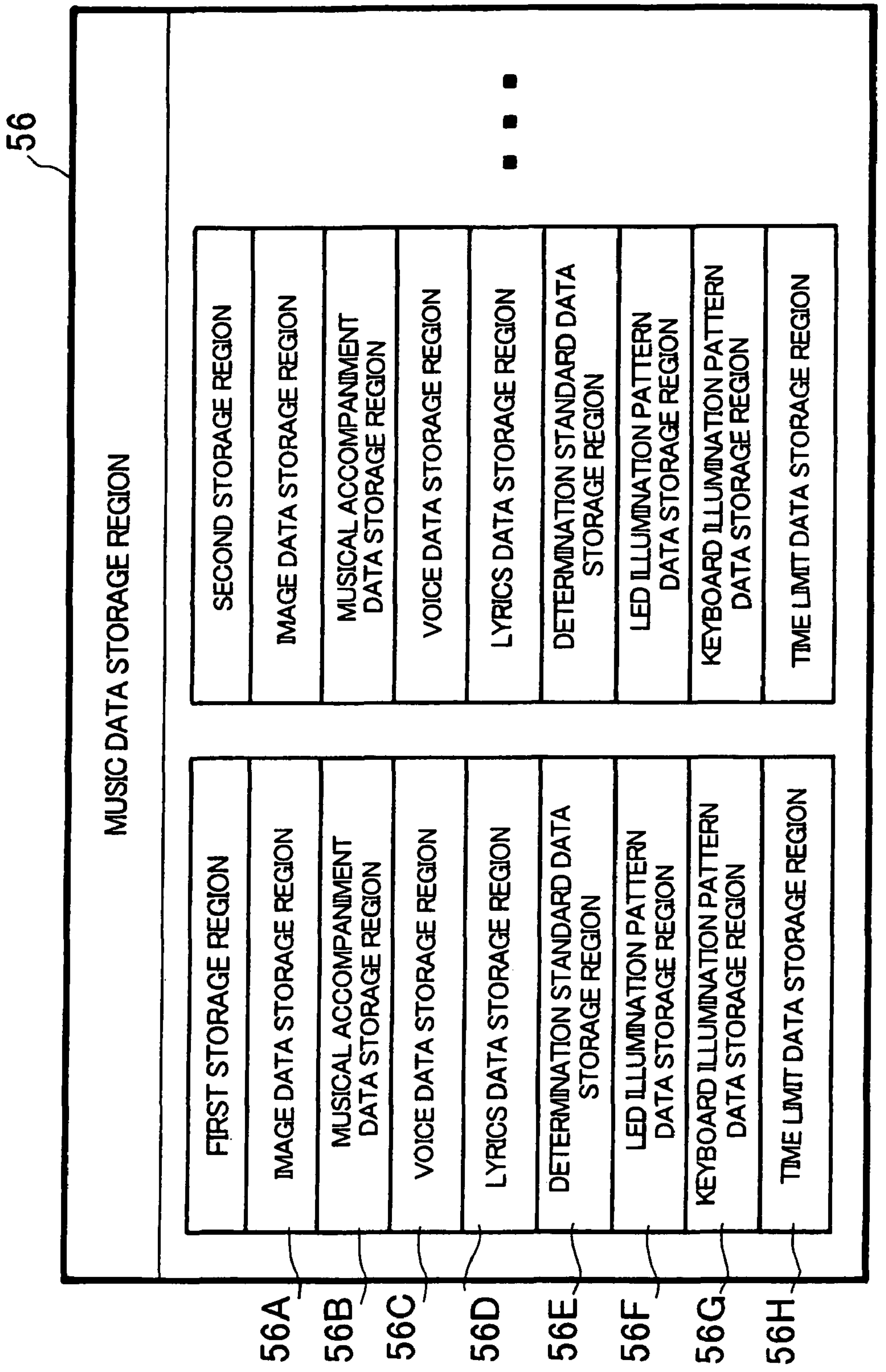
FIG. 11 is a schematic figure showing a music data storage region on a HDD of the typing game apparatus according to this embodiment.

Now, the music data storage region 56 formed on the HDD 55 will be explained in detail with reference to FIG. 11. FIG. 11 is a schematic explanatory figure showing this music data storage region 56.

As shown in FIG. 11, the music data storage region 56 of the typing game apparatus 1 according to this embodiment comprises a plurality of storage regions (in this embodiment, a first through a hundredth storage region) which correspond to the number of items of music data which can be stored (in this embodiment, one hundred songs); and, in each of these storage regions, there are provided an image data storage region 56A, a musical accompaniment data storage region 56B, a voice data storage region 56C, a lyrics data storage region 56D, a determination standard data storage region 56E, an LED illumination pattern data storage region 56F, a keyboard illumination pattern data storage region 56G, and a time limit data storage region 56H.

To explain each of these storage regions in the following, the image data storage region 56A is a storage region in which are stored image data, among this music data, related to the PV image 20 of the artist which is displayed on the second liquid crystal display 4 (refer to FIG. 4A and FIG. 5A).

Moreover, the musical accompaniment data storage region 56B is a storage region in which are stored musical accompaniment data, among the music data, related to accompaniment by musical instruments, and outputted from the speakers 8.

Furthermore, the voice data storage region 56C is a storage region in which are stored voice data, among the music data, related to the singing voice of the artist who is singing, and outputted from the speakers 8.

Moreover, the lyrics data storage region 56D is a storage region in which are stored lyrics data, among the music data, related to the text data of the lyrics of the song. And, as described above, during the execution of the typing game, these lyrics of the song are displayed in order on the first liquid crystal display 3 one phrase at a time (refer to FIG. 4B and FIG. 5B). Furthermore, this entire phrase is displayed on the second liquid crystal display 4 when the typing game has been finished (refer to FIG. 6A).

And the determination standard data storage region 56E is a storage region in which are stored determination standard data, among the music data, related, during the execution of the typing game, to determination of the correctness or the incorrectness of the characters which the player has typed, and to a standard for determining the correctness of his input timing. And the CPU 51 adds to the number of errors, the score, the points and so on, based on this stored determination standard data and on the operation signals from the keyboard 6, as will be described hereinafter.

Yet further, the LED illumination pattern data storage region 56F and the keyboard illumination pattern data storage region 56G are storage regions in which are respectively stored, among the music data, pattern data for illumination device illumination for illuminating the illumination devices 7, and pattern data for keyboard illumination for illuminating the full color LEDs 155 which are provided in the interiors of the keys. With the typing game apparatus 1 according to this embodiment, during the execution of the typing game, the pair of illumination devices 7 are each illumination controlled to an illumination state (an illumination color, and whether it is turned on or off) by an illumination control circuit 62 which will be described hereinafter, based on the pattern data for illumination device illumination which is stored, and on the typing game execution processing program (refer to FIG. 16) which will be described hereinafter. Furthermore, during the execution of the typing game, the state of illumination of each of the full color LEDs 155 provided in the interiors of the keys is controlled to a respective illumination state (an illumination color, and whether it is turned on or off) by the illumination control circuit 62 which will be described hereinafter, based on the stored pattern data for keyboard illumination. It should be understood that, as illumination patterns for the full color LEDs 155, there may be utilized a pattern of illumination which assists key input for a novice at the typing game by turning on in order the keys which must be inputted with illumination colors which are different from the illumination color of the keyboard 6 as a whole, or a pattern in which the illumination colors of all of the keys which are disposed on the keyboard 6 are varied along with the image for the song.

Still further, the time limit data storage region 56H is a storage region in which are stored, among the music data, time limit data related to a time limit over which the music data may be used; this time limit data comprises two items of date data: a day when the music data becomes usable (a usage start day); and a day when the music data becomes unusable (a usage end day). This time limit data is utilized along with a timer 58 (refer to FIG. 10) in the management of time limits for use of the music data; and the typing game is controlled by the CPU 51 so that the typing game cannot be played using music data whose time limit for use has been exceeded.

Now, returning to FIG. 10, the explanation of the control system of the typing game apparatus 1 will be continued. A game communication unit 57 is a device which, along with converting a signal which is outputted by the typing game apparatus 1 into a signal of a format which can be transmitted according to a communication method such as a telephone line or a LAN cable or the like, and transmitting it to the server 80, also receives a signal which has been transmitted from the server 80, and re-converts it into a signal of a format capable of being read in by the typing game apparatus 1; and it is connected to a server communication unit 81 of the server 80 via the network N, such as the internet or the like, which is capable of bi-directional communication (refer to FIG. 9).

Moreover, a timer 58 which comprises a calendar function is connected to the CPU 51. The information from this timer 58 is transmitted to the CPU 51, and the CPU 51 performs management of the usage time limits for music data which has been stored, from the information of the timer 58 and from the time limit data which is stored in the time limit data storage region 56H of the HDD 55.

Furthermore, a display control circuit 60 is a section which is connected via the I/O 52 to the CPU 51, and which controls the display contents of the first liquid crystal display 3 and the second liquid crystal display 4 according to the results of calculation processing by the CPU 51. Here, this display control circuit 60 comprises a program ROM, an image ROM, an image control CPU, a work RAM, a VDP (Video Display Processor), a video RAM, and the like. And, in the program ROM, there are stored a program for image control and various types of selection table related to display on the first liquid crystal display 3 and the second liquid crystal display 4. Furthermore, there are stored in the image ROM, for example, dot data for forming images which are displayed on the first liquid crystal display 3, such as the search mode selection screen 12 (refer to FIG. 2), the song selection screen 16 (refer to FIG. 3), the main game screen 21 (refer to FIGS. 4B and 5B), the game result screen 30 (refer to FIG. 6B), the lyrics results display screen 35 (refer to FIG. 6A), and so on.

And the image control CPU performs determination, from among the dot data which has been stored in advance in the image ROM, of the images to display on the first liquid crystal display 3 and on the second liquid crystal display 4, according to an image control program which has been stored in advance in the program ROM, based on parameters which have been set by the CPU 51. Moreover, the VDP forms images according to the display contents which have been determined by the image control CPU, and outputs them to the first liquid crystal display 3 and to the second liquid crystal display 4.

By doing this, for example, during the standby state, a demo screen which consists of a PV for any desired song, an advertisement, a list of rankings or the like may be displayed, and furthermore, after a coin has been inserted into the coin insertion slot 9, the search mode selection screen 12 (refer to FIG. 2) and the song selection screen 16 (refer to FIG. 3) are displayed on the first liquid crystal display 3. And, when the execution of the typing game on the typing game apparatus 1 is started, along with displaying the lyrics data included in the music data one phrase at a time on the first liquid crystal display 3, based on the input results from the keyboard 6, control and so on is performed for displaying the character string 23A which has already been typed by the player in the Alphabet letters display section 23. On the other hand, the PV, which is image data included in the music data, is displayed on the second liquid crystal display 4. And, moreover, after the typing game has been finished, the game result screen 30 (refer to FIG. 6B) is displayed on the first liquid crystal display 3, while the lyrics results display screen 35 (refer to FIG. 6A) is displayed on the second liquid crystal display 4 as scrolling.

A sound control circuit 61, along with being connected via the I/O 52 to the CPU 51, is also connected to the speakers 8. And, when the typing game is executed and the music data which has been stored in the music data storage region 56 of the HDD 55 is read out, the musical accompaniment data and the voice data which are included in this music data are converted into a sound signal by this sound control circuit 61, and are outputted by the speakers 8.

And an illumination control circuit 62, along with being connected via the I/O 52 to the CPU 51, is also connected to the illumination devices 7 and to the full color LEDs 155 (refer to FIG. 8) which are disposed in the interiors of the keys. When the music data which is stored in the music data storage region 56 of the HDD 55 is read out by the CPU 51, this illumination control circuit 62 controls the states of illumination of the illumination devices 7 and of the full color LEDs 155, based on the pattern data for LED illumination and on the pattern data for keyboard illumination which are included in this music data.

Furthermore, the keyboard 6 is connected to the CPU 51. When the keytops 153 are actuated by being pressed down, the key switches 159 which are provided in the interiors of the keys of the keyboard 6 transmit electrical signals which pass through the switch circuit board 151. The CPU 51 controls the various types of operation which are to be executed corresponding to the various keys, based on the switch signals which are outputted from the various key switches 159 due to the various keys being pressed down.

A coin sensor 63 is a sensor which detects a coin (for example a 100 yen coin) which is used as payment for performing the typing game on this typing game apparatus 1.

This coin sensor 63 is provided in the interior of the coin insertion slot 9, and is connected via the I/O 52 to the CPU 51. Accordingly, based on insertion of a coin into the coin insertion slot 9, the coin sensor 63 generates a coin inserted signal and sends it to the CPU 51. And the CPU 51 makes it possible to execute the typing game, when it has detected coin insertion signals corresponding to a predetermined game fee (for example 200 yen).

Moreover, a card sensor 64 is a sensor which detects whether or not an IC card is inserted into the card insertion slot 10, and a card reader-writer 65 is a device for performing reading out and writing in of data to and from an IC tag which is provided on such an IC card. The card sensor 64 and the card reader-writer 65 are both provided in the interior of the card insertion slot 10, and are connected via the I/O 52 to the CPU 51. And, if an IC card has been detected by the card sensor 64, on performance of a predetermined operation, the game result of the typing game is read out from the IC tag by the card reader-writer 65 (S3 of FIG. 13). Moreover, when the typing game has been finished, it performs writing into the IC tag (S9 of FIG. 13) of the new game result (i.e. of the score and the points which have been acquired).

Furthermore, a spotlight control circuit 66, along with being connected to the CPU 51 via the I/O 52, is also connected to the spotlights 11. And, based on commands from the CPU 51, this spotlight control circuit 66 controls the illumination states of the spotlights 11, and, in particular, when the illumination states of the illumination devices 7 are controlled by the above described illumination control circuit 62 and the like, by emitting light while causing the spotlights 11 to rotate, it makes the illumination effects of the illumination devices 7 more gaudy. Accordingly, in the LED illumination pattern data which is included in the music data stored in the music data storage region 56 of the HDD 55, there is appended contents for controlling the illumination states of the spotlights 11, in order to make the illumination effects of the illumination devices 7 more gaudy. However, these contents for controlling the illumination states of the spotlights 11 may also be provided separately from the LED illumination pattern data.

Next, an example of a display sequence setting table 67, which is stored in the RAM 54, and in which a display ordering for the songs which are displayed on the song selection screen 16 (refer to FIG. 3) is set, will be explained with reference to FIG. 12. FIG. 12 is a schematic figure showing one example of a display sequence setting table 67 according to this embodiment.

As shown in FIG. 12, this display sequence setting table 67 consists of a display order which corresponds to the numbers of the songs which are compiled, IDs which specify the songs, the song names, and the artist names of the songs.

For example, with the typing game apparatus 1 according to this embodiment, at a maximum, the music data for a hundred songs is stored in the music data storage region 56 of the HDD 55, and accordingly a display order of “1” through “100” is set for these songs which are currently stored. Here, in particular, the display sequence setting table 67 shown in FIG. 12 is the display sequence setting table directly after the list by song names selection section 13 has been selected with the search mode selection screen 12 (refer to FIG. 2), and the display order based on the song names sorted in the order of Alphabet letters “A” through “Z” is set. It should be understood that FIG. 3 is the song selection screen 16 which is displayed based on the display sequence setting table 67 of FIG. 12.

And by inputting a character string for searching using the character input keys 111 (refer to FIG. 7) of the keyboard 6 in the state in which the song selection screen 16 (refer to FIG. 3) is displayed, as will be described hereinafter, the display order of the correspondence established for the songs in the display sequence setting table 67 changes (S18 and S24 of FIG. 14). Together with this, the display ordering of the songs which are displayed in the song selection screen 16 (refer to FIG. 3) also changes (S19 and S25 of FIG. 14).

Next, a main processing program which is performed by this typing game apparatus 1 structured as above will be explained with reference to FIG. 13. FIG. 13 is a flow chart showing the main processing program of the typing game apparatus according to this embodiment. It should be understood that each of the programs shown in the flow charts of FIGS. 13 through 16 below is stored in the ROM 53 or the RAM 54 which is provided to the typing game apparatus 1, and is executed by the CPU 51.

As shown in FIG. 13, first, in a step S1, based on the detection signal from the card sensor 64, the CPU 51 determines whether or not an IC card is inserted into the card insertion slot 10. And, if it has determined that an IC card is inserted (S1: YES), then in a step S2 it is further determined whether or not a check request from the player for the data contents has been received. On the other hand, if it has been determined that no IC card is inserted (S1: NO), then the flow of control proceeds to a step S4.

Thus, with the typing game apparatus 1 according to this embodiment, when the shift key 113 on the keyboard 6 is pressed down in the state before insertion of a coin and also with an IC card possessed by the player having been inserted into the card insertion slot 10, a list of the game results which have been recorded on the IC card (the score and points and so on which the player has acquired in previous games) is displayed on the first liquid crystal display 3, so that it becomes possible for the player to check its contents.

Accordingly, in the determination of the step S2, it is determined, based on the operation signal from the keyboard 6, whether or not the shift key 113 has been pressed down, and if it has been determined that the shift key 113 has been pressed down (S2: YES), then the data on the IC tag which is mounted on the IC card is read out by the card reader-writer 65, and, based on this read out data, a list of game results is displayed (in a step S3) on the first liquid crystal display 3.

Furthermore, in the step S4, a starting acceptance procedure is performed. In concrete terms, in this starting acceptance procedure, it is determined whether or not coins (100 yen coins or the like) have been inserted into the coin insertion slot 9 to a predetermined monetary amount (in this embodiment, to the amount of 200 yen), and the system waits in a standby state, while displaying a demo screen or the like consisting of a demo play game screen, a PV of some desired song, an advertisement, a list of ranking data, or the like on the display, until such a number of coins are thus inserted. It should be understood that, with the typing game apparatus 1 according to this embodiment, when a coin is inserted into the coin insertion slot 9, it is detected by the coin sensor 63, which outputs a coin detection signal to the CPU 51. Due to this, it is possible for the CPU 51 to determine that a coin has been inserted by the player.

Figure 14:
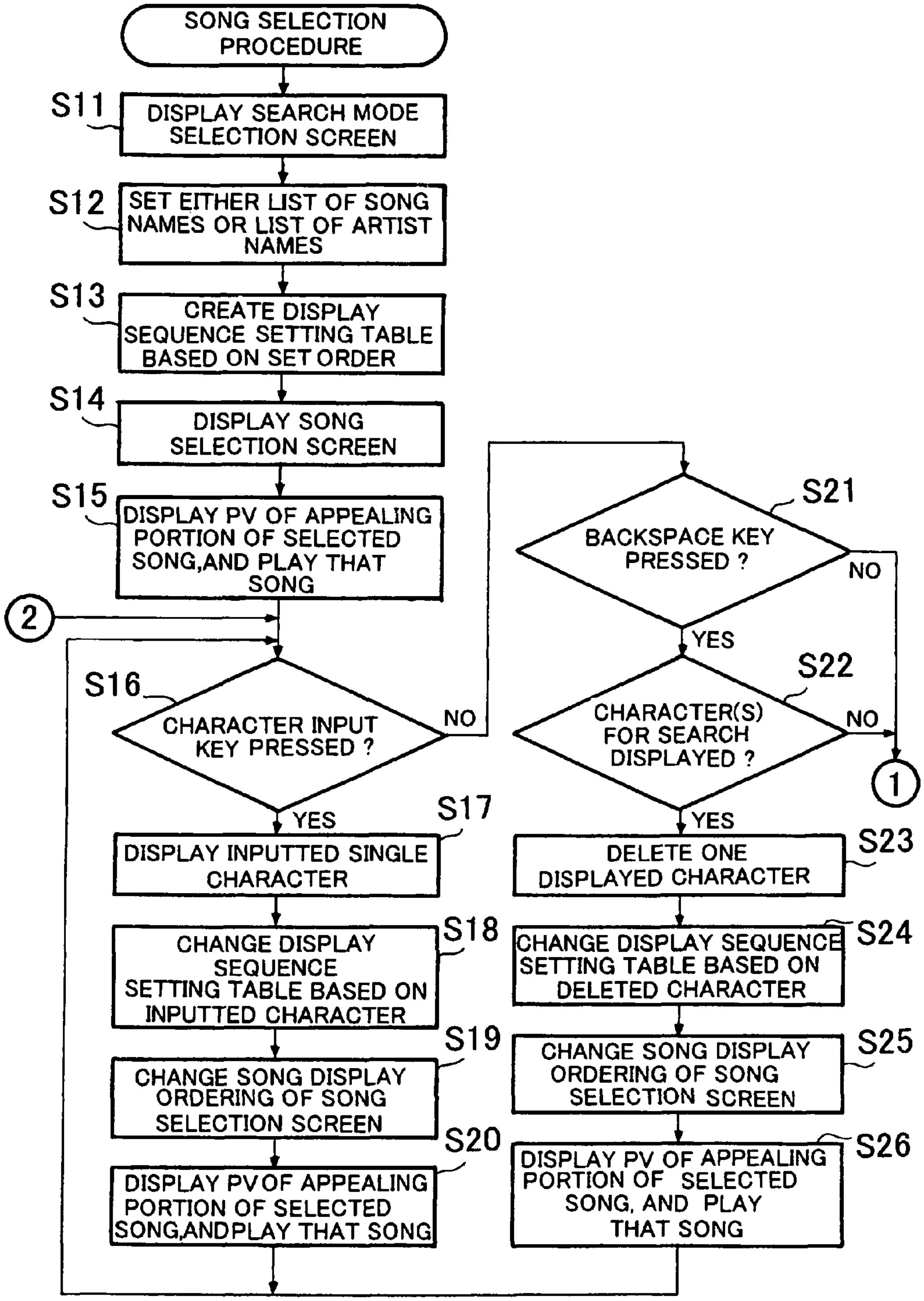
FIG. 14 is a flow chart of a song selection processing program of the typing game apparatus according to this embodiment.
Figure 1:
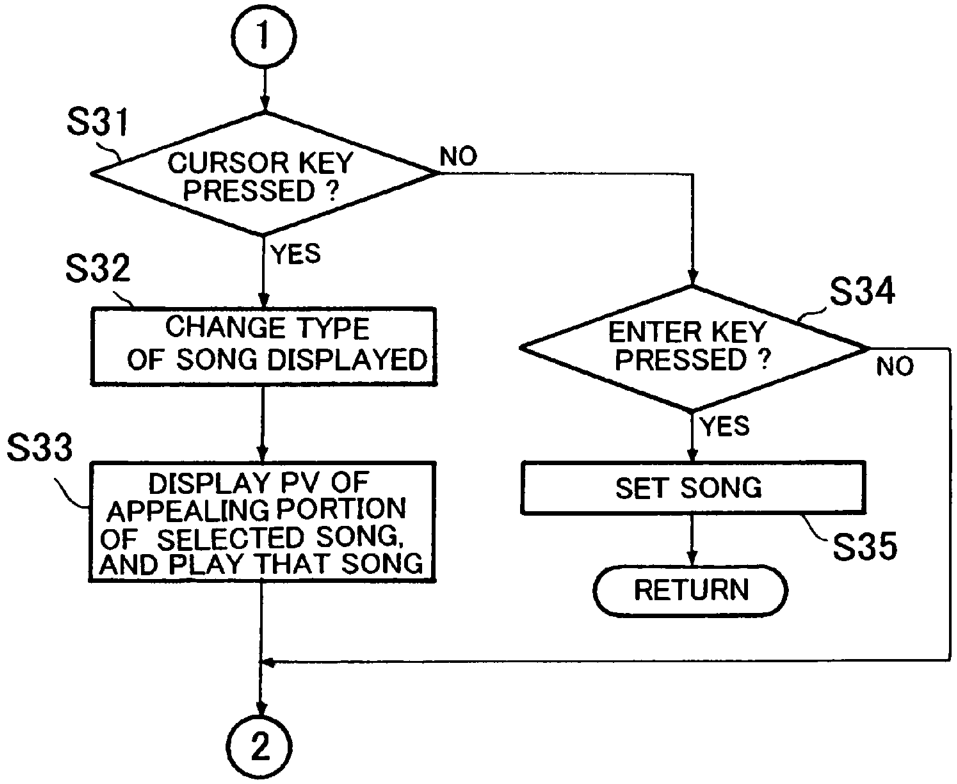

Next, in a step S5, a song selection procedure shown in FIGS. 14 and 15 is performed. In this song selection procedure, based on the type of music data which is stored in the music data storage region 56 of the HDD 55 as will be described hereinafter, the search mode selection screen 12 (refer to FIG. 2) and the song selection screen 16 (refer to FIG. 3) are displayed on the first liquid crystal display 3, and the song which is to be used in the present game is searched for and is set.

Figure 16:
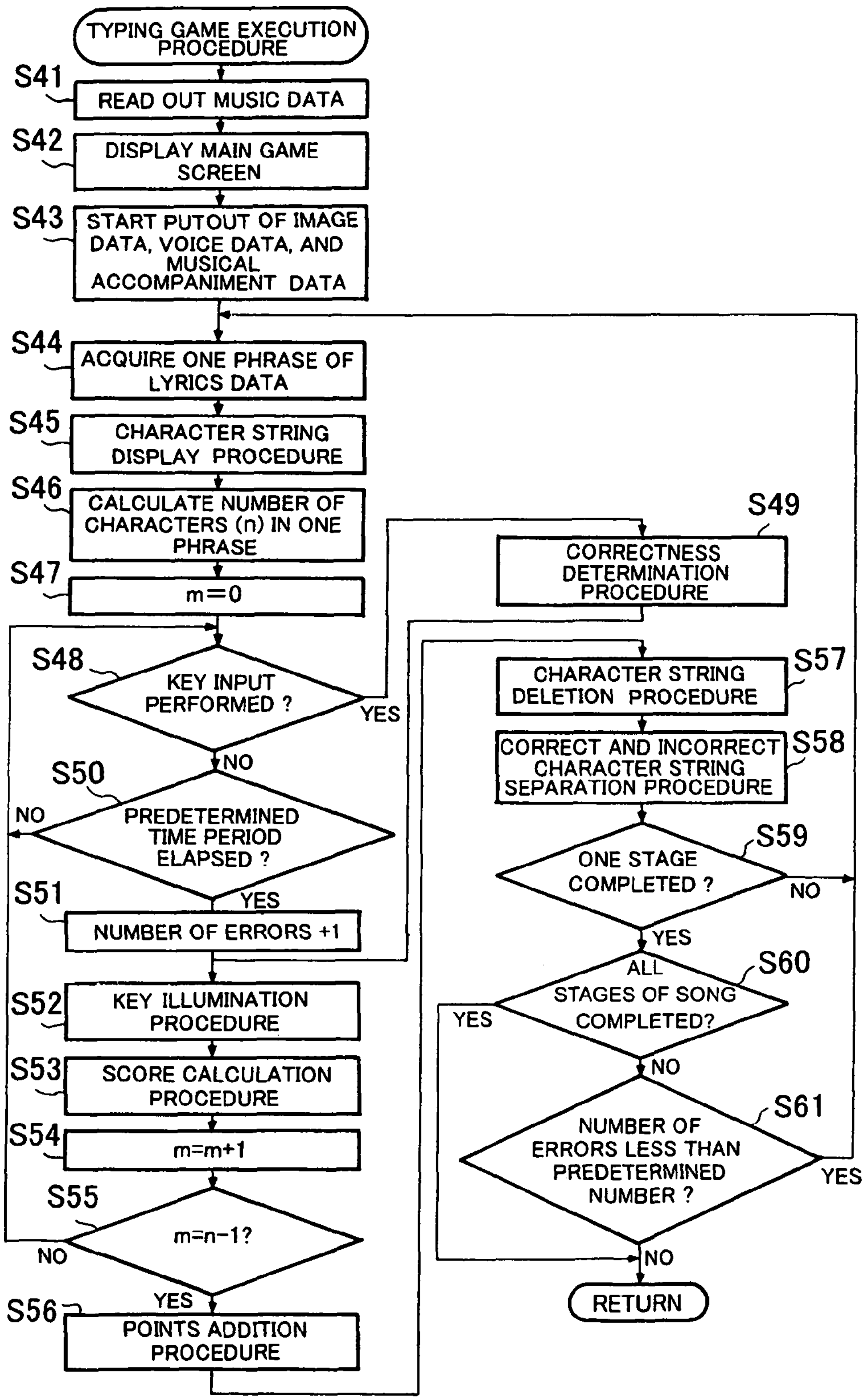
FIG. 16 is a flow chart of a typing game execution processing program of the typing game apparatus according to this embodiment.
Figure 1:
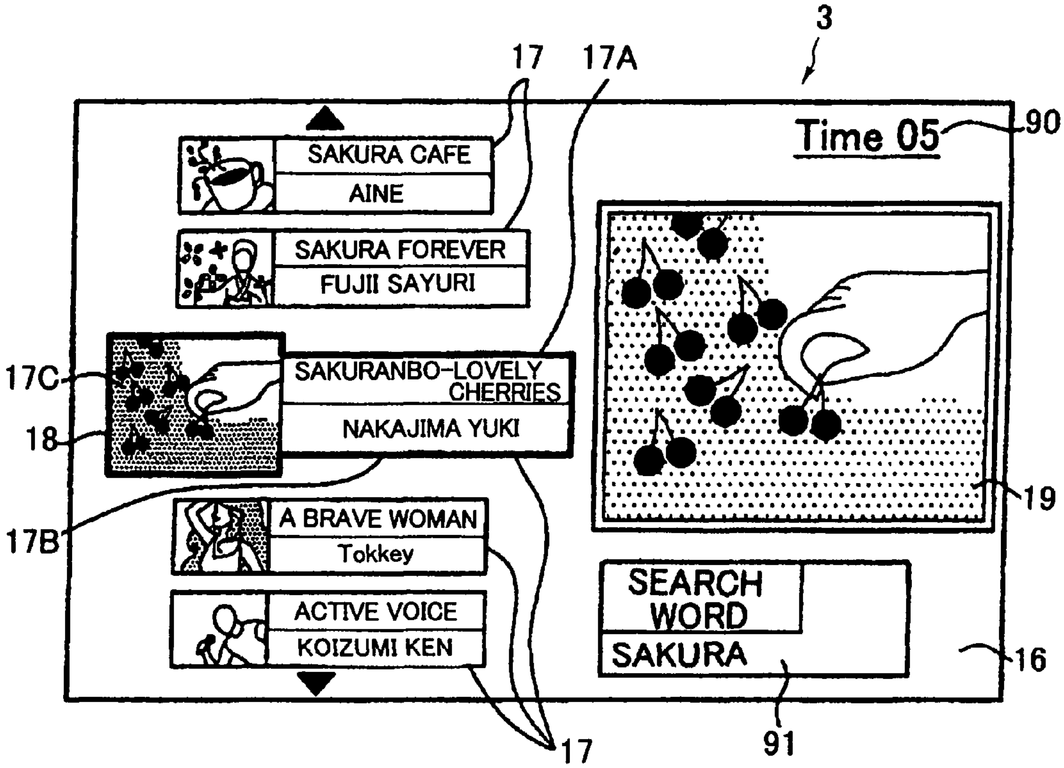

And, in a step S6, a typing game execution procedure shown in FIG. 16 is performed, based on the song which is set in the step S5. In this typing game execution procedure, along with playing the song as will be described hereinafter, the score and the points are added up based on the results of typing on the keyboard 6, and this is continued until a predetermined termination condition is satisfied.

Thereafter, when the typing game execution procedure is terminated, a game result display procedure is performed (in a step S7). In this game result display procedure, along with displaying the game result screen 30 (refer to FIG. 6(B)) on the first liquid crystal display 3 based on the results of the typing game execution procedure in the step S6, the lyrics results display screen 35 (refer to FIG. 6A) is displayed as scrolling on the second liquid crystal display 4.

Next, in a step S8, the CPU 51 determines whether or not an IC card is inserted into the card insertion slot 10, based on the detection signal from the card sensor 64. And, if it has been determined that an IC card is thus inserted (S8: YES), then furthermore in a step S9 the points which have been acquired during this typing game and the score which has been acquired, which are stored in the RAM 54, are both written by the card reader-writer 65 into the IC tag which is mounted on the IC card. It should be understood that the data which are written here may be referred to by the data contents display procedure of the step S3.

On the other hand, if it has been decided that an IC card is not inserted (S8: NO), then this procedure terminates.

Next, the song selection processing program of the aforementioned step S5 which is performed by this typing game apparatus 1 will be explained with reference to FIGS. 14 and 15. FIGS. 14 and 15 are flow charts showing the song selection processing program according to this embodiment.

In the song selection procedure, first, in a step S11, the search mode selection screen 12 (refer to FIG. 2) is displayed on the first liquid crystal display 3. In this search mode selection screen 12, the list by song names selection section 13 and the list by artist names selection section 14 are displayed, and, by the player operating the keyboard 6, based on the list of the songs which can be played, a selection is made as to whether to display a "list of song names" in the order of Alphabet letters "A" through "Z", or whether to display a "list of artist names" in the order of Alphabet letters "A" through "Z".

Next, in a step S12, based on the operation signals from the keyboard 6, the CPU 51 sets a first display ordering, which basically consists of a display ordering for the songs as either a "list of song names" or a "list of artist names".

And, in a step S13, the names of the songs related to the music data stored in the music data storage region 56 of the HDD 55, and the names of their artists, are both acquired, and furthermore, based on the first display ordering which is set in the step S12, a display sequence setting table 67 (refer to FIG. 12) is created in the RAM 54.

Next, based on the display sequence setting table 67 which is created in the step S13 based on the first display ordering, the song selection screen 16 (refer to FIG. 3) is displayed on the first liquid crystal display 3 (in a step S14). In concrete terms, first, songs which have been put into correspondence with the display order "1" through "5" of the display sequence setting table 67 are each displayed in the five song candidate display sections 17, as a list of the song names 17A, a list of the artist names 17B, and a list of the images 17C of the PVs of their appealing portions. And, by scrolling the song candidate display sections 17 in the upward direction or in the downward direction by operating the cursor keys 114 as will be described hereinafter, songs to which a different display order has been established in correspondence are caused to be displayed in ascending order, or in descending order, in the song candidate display sections 17 (in steps S31 through S33).

Furthermore, a PV of a particularly appealing portion of the song which is displayed in that song candidate display section 17 at which the song selection cursor 18 is positioned (in concrete terms, which is displayed in that song candidate display section 17 which is positioned at the center) is displayed in the selected PV display section 19, and moreover an appealing portion of the song is outputted via the speakers 8 (in a step S15).

Furthermore, in a step S16, a determination is made as to whether or not a character input key 111 has been pressed down. Here, whether a character input key 111 has been pressed down or not is determined based on the operation signals which are transmitted from the keyboard 6, and, if it has been determined that a character input key 111 has been pressed down (S16: YES), then the songs are searched as described below, based on the operation of the character input key 111 (i.e. on which key corresponding to which character has been pressed down).

First, in a step S17, the character which has been inputted via a character input key 111 is displayed in a search character string display section 91 (refer to FIG. 3).

And the present display sequence setting table 67 is changed, based on the new character string to which the character which has been inputted via the character input keys 111 in the step S18 has been added. In concrete terms, if "list of song names" is set as the first display ordering in the step S12, then, from the "song names" (refer to FIG. 12) which are recorded in the display sequence setting table 67, the songs are extracted for which the characters which have been inputted are used as the head characters of their names, and the correspondence of the display ordering is changed so that the songs which have been thus extracted are ordered in the display before the other songs. Moreover, if "list of artist names" is set as the first display ordering in the step S12, then, from the "artist names" (refer to FIG. 12) which are recorded in the display sequence setting table 67, the songs are extracted for which the new character string with the characters which are newly inputted added is used as the head characters of the names of their artists, and the correspondence of the display ordering is changed so that the songs which have been thus extracted are ordered in the display before the other songs.

Here, the concrete procedure for changing the display sequence setting table 67 when a character string for searching has been inputted will be explained using FIG. 17. It should be understood that, in FIG. 17, it is taken that the case is explained in which, in particular, "list of song names" has been set in the step S12 as the first display ordering, and the case in which "list of artist names" has been set as the first display ordering is omitted. FIG. 17 is a schematic figure showing the way in which the display sequence setting table 67 is changed when a character string for searching for the name of a song is inputted.

As shown in FIG. 17, the display sequence setting table 67 of FIG. 17A is one which shows the state in which no character is inputted into the search character string display section 91, and at this time the display sequence setting table comes to be based on the first display ordering which is created in the step S13.

Here, when the character "sa" is newly inputted, those songs are extracted from the "song names" of display sequence setting table 67 for which "sa" is used as the head character, and the correspondence of the display order is changed so that they are shown in the display ordering before the other songs (those for which the head character of their names is some character other than "sa"). In concrete terms if, as in the display sequence setting table 67 of FIG. 17B, there are fifteen songs among the total of a hundred stored songs for which the head character of their names is "sa", then the display orders "1" through "15" are put into correspondence with these songs for which "sa" is used as the head character, while the display orders "16" through "100" are put into correspondence, in the conventional display order of Alphabet letters, with those songs for which some character other than "sa" is used as the head character. The result of this procedure is that a display sequence setting table is created which is based on a second display ordering in which the songs which have "sa" as the head character of their names are displayed at higher priority. By doing this, when the player wishes to perform the game with a song whose name has "sa" as its head character, it is not necessary for him to search through a large number of songs, and it is possible for him to select the song which he desires in a quick and moreover simple and easy manner.

Furthermore when, after "sa", next the character "ku" is newly inputted, the songs for which "saku" is used as the head characters are extracted from the "song names" in the display sequence setting table 67, and the correspondence of the display order is changed so that they are shown in the display ordering before the other songs (those for which the head characters of their names are some characters other than "saku"). In concrete terms if, as in the display sequence setting table 67 of FIG. 17C, there are seven songs among the total of a hundred stored songs for which the head characters of their names are "saku", then the display orders "1" through "7" are put into correspondence with these songs for which "saku" is used as the head characters, while the display orders "8" through "100" are put into correspondence, in the conventional display order of Alphabet letters, with those songs for which some characters other than "saku" are used as the head characters. The result of this procedure is that a display sequence setting table is created which is based on a third display ordering in which the songs which have "saku" as the head characters of their names are displayed at higher priority. By doing this, when the player wishes to perform the game with a song whose name has "saku" as its head characters, it is not necessary for him to search through a large number of songs, and it is possible for him to select the song which he desires in a quick and moreover simple and easy manner.

Furthermore when, after "saku", next the character "ra" is newly inputted, the songs for which "sakura" is used as the head characters are extracted from the "song names" in the display sequence setting table 67, and the correspondence of the display order is changed so that they are shown in the display ordering before the other songs (those for which the head characters of their names are some characters other than "sakura"). In concrete terms if, as in the display sequence setting table 67 of FIG. 17D, there are three songs among the total of a hundred stored songs for which the head characters of their names are "sakura", then the display orders "1" through "3" are put into correspondence with these songs for which "sakura" is used as the head characters, while the display orders "4" through "100" are put into correspondence, in the conventional display order of Alphabet letters, with those songs for which some characters other than "sakura" are used as the head characters. The result of this procedure is that a display sequence setting table is created which is based on a fourth display ordering in which the songs which have "sakura" as the head characters of their names are displayed at higher priority. By doing this, when the player wishes to perform the game with a song whose name has "sakura" as its head characters, it is not necessary for him to search through a large number of songs, and it is possible for him to select the song which he desires in a quick and moreover simple and easy manner.

Furthermore, to return to FIG. 14 for the explanation of the song selection processing program, in a step S19, the display ordering of the songs displayed in the song candidate display sections 17 of the song selection screen 16 is changed, based on the display sequence setting table 67 which has been changed in the step S18.

In concrete terms, first, for the songs to which the display orders "1" through "5" are newly put into correspondence in the display sequence setting table 67, the song names 17A, the artist names 17B, and the images 17C of the PVs of their appealing portions, are each displayed in the five song candidate display sections 17. And, by scrolling the song candidate display sections 17 in the upward direction or in the downward direction by operating the cursor keys 114 as will be described hereinafter, these songs for which a different display order has been established in correspondence are caused to be displayed in ascending order, or in descending order, in the song candidate display sections 17 (in the steps S31 through S33).

Furthermore, a PV of a particularly appealing portion of the song which is displayed in that song candidate display section 17 at which the song selection cursor 18 is positioned (in concrete terms, which is displayed in that song candidate display section which is positioned at the center) is displayed in the selected PV display section 19, and moreover a appealing portion of the song is outputted via the speakers 8 (in a step S20). Thereafter, the flow of control returns to the determination procedure of the step S116.

Here, FIG. 18 is a figure showing the song selection screen 16 when "Sakura" has been inputted as the character string for searching. When "Sakura" has been inputted into the search character string display section 91 as shown in FIG. 18, display is performed of the song selection screen 16 based on the display sequence setting table 67 (table shown in FIG. 17D) which is based on the fourth display ordering in which the songs whose names include "Sakura" as their head characters are displayed with priority.

In concrete terms, the songs which are displayed are the three songs whose names include "Sakura" as their head characters, and with which the display orders "1" through "3" of the display sequence setting table 67 are put into correspondence, and the two songs, among the songs other than the songs whose names include "Sakura" as their head characters and with which the display orders "4" through "5" are put into correspondence, which are the first in the conventional display order of Alphabet letters. And a PV of a particularly appealing portion of the song which is displayed in the song candidate display section 17 which is positioned in the middle (in FIG. 18, the song whose title is "Sakuranbo" and the name of whose artist is "Nakajima Yuki") is displayed in the selected PV display section 19, and moreover the music of this appealing portion is outputted via the speakers 8.

On the other hand, if it has been determined that no character input key 111 has been pressed down (S16: NO), then next, in a step S21, a determination is made as to whether or not the backspace key 116 has been pressed down. And, if it has been determined that the backspace key 116 has been pressed down (S21: YES), then, along with deleting the character string which is inputted with the character input key 111 in the step S17, the search result is changed as follows.

First, in a step S22, it is determined whether or not a character string for searching containing at least one character or more is being displayed in the search character string display section 91 (refer to FIG. 3), and if it is determined that such a character string for searching is being displayed (S22: YES), then (in a step S23) one character is deleted from the search character string display section 91 (refer to FIG. 3) which has been inputted with the character input keys 111. On the other hand, if it is determined that not even one character is inputted in the search character string display section 91 (S22: NO), then the flow of control shifts to the determination procedure of S31 of FIG. 15.

And the present display sequence setting table 67 is changed, based on the character which is deleted by operation of the backspace key 116 in the step S24. In concrete terms, if "list of song names" is set as the first display ordering in the step S12, then the songs in which the character string after deletion is used for the head characters of their names are extracted from the "song names" (refer to FIG. 12) which are registered in the display sequence setting table 67, and the correspondence of the display order is changed so that the display ordering for the songs which have thus been extracted is before the display ordering for the other songs.

Furthermore, if "list of artist names" is set as the first display ordering in the step S12, then the songs in which the character string after deletion is used for the head characters of the names of their artists are extracted from the "artist names" (refer to FIG. 12) which are registered in the display sequence setting table 67, and the correspondence of the display order is changed so that the display ordering for the songs which have thus been extracted is before the display ordering for the other songs. However, if the entire character string is deleted by operation of the backspace key 116, then the song selection screen 16 (refer to FIG. 3) is displayed on the first liquid crystal display 3, based on a display sequence setting table 67 which is based on the first display ordering created in the step S113.

Now, a concrete procedure for changing the display sequence setting table 67 when the character string for searching has been deleted will be explained with reference to FIG. 17.

When, for example, in the state in which "Sakura" has been inputted, the character "ra" is deleted, then the songs for which "saku" is used as the head characters are extracted from the "song names" in the display sequence setting table 67, and the correspondence of the display order is changed so that their display ordering becomes earlier than that of the other songs (those songs other than those for which "saku" is used as the head characters of their names). As a result, the display sequence setting table becomes one based on the third display ordering, in which the songs whose names have "saku" as their head characters are displayed with higher priority than the other songs.

In the same manner when, in the state in which "Saku" has been inputted, the character "ku" is deleted, then the songs for which "sa" is used as the head characters are extracted from the "song names" in the display sequence setting table 67, and the correspondence of the display order is changed so that their display ordering becomes earlier than that of the other songs (those songs other than those for which "sa" is used as the head characters of their names). As a result, the display sequence setting table becomes one based on the second display ordering, in which the songs whose names have "sa" as their head characters are displayed with higher priority than the other songs.

Moreover when, in the state in which "Sa" has been inputted, this character "sa" is deleted, then the display sequence setting table becomes one based on the first display ordering created in the step S13.

Next, in a step S25, the display ordering of the songs which are displayed in the song candidate display sections 17 of the song selection screen 16 is changed based on the display sequence setting table 67 which has been changed in the step S24.

In concrete terms, first, for the songs to which the display orders "1" through "5" are newly put into correspondence in the display sequence setting table 67, the song names 17A, the artist names 17B, and the images 17C of the PVs of their appealing portions, are each displayed in the five song candidate display sections 17. And, by scrolling the song candidate display sections 17 in the upward direction or in the downward direction by operating the cursor keys 114 as will be described hereinafter, these songs for which a different display order has been established in correspondence are caused to be displayed in ascending order, or in descending order, in the song candidate display sections 17 (in the steps S31 through S33).

Furthermore, a PV of a particularly appealing portion of the song which is displayed in that song candidate display section 17 at which the song selection cursor 18 is positioned (in concrete terms, which is displayed in that song candidate display section 17 which is positioned at the center) is displayed in the selected PV display section 19, and moreover a appealing portion of the song is outputted via the speakers 8 (in a step S26). Thereafter, the flow of control returns to the determination procedure of the step S16.

Still further, in a step S31 of FIG. 15, a determination is made as to whether or not a cursor key 114 has been pressed down. Here, it is determined whether or not a cursor key 114 has been pressed down, based on the operation signals which are transmitted from the keyboard 6, and, if it has been determined that a cursor key 114 has been pressed down (S31: YES), then the song candidate display sections 17 which are displayed on the first liquid crystal display 3 are scrolled in the upwards direction or in the downwards direction (in a step S32), based on the actuation of the cursor keys 114 (i.e. on which of the up key and the down key has been pressed). By doing this, the songs to which a different display order has been established in correspondence are displayed in the song candidate display sections 17 in ascending order or in descending order.

Furthermore, a PV of a particularly appealing portion of the song which is displayed in that song candidate display section 17 at which the song selection cursor 18 is positioned (in concrete terms, which is displayed in that song candidate display section 17 which is positioned at the center) is displayed in the selected PV display section 19, and moreover a appealing portion of the song is outputted via the speakers 8 (in a step S33). Thereafter, the flow of control returns to the determination procedure of the step S16.

On the other hand, if in the step S31 it has been determined that no cursor key 114 has been pressed down (S31: NO), then next in a step S34 it is determined whether or not the enter key 112 has been pressed down. And, if it has been determined that the enter key 112 has been pressed down (S34: YES), then the song at which the current song selection cursor 18 is positioned is set as the song for which the typing game will be performed this time (in a step S35), and a typing game execution procedure which will be described hereinafter is started. On the other hand, if it has been determined that the enter key 112 has not been pressed down (S34: NO), then the flow of control again returns to the determination procedure of the step S16.

Next, the typing game execution processing program of the above step S6 which is performed by this typing game apparatus 1 will be explained with reference to FIG. 16. FIG. 16 is a flow chart showing the typing game execution processing program performed by the typing game apparatus according to this embodiment.

In this typing game execution procedure, first, in a step S41, the CPU 51 reads out the music data which corresponds to the song which is selected by the song selection procedure of the above step S5 from among the music data stored in the respective storage regions (refer to FIG. 11) of the music data storage region 56 of the HDD. And, in particular, the lyrics data stored in the lyrics data storage region 56D is temporarily stored in the RAM 54, divided up into single phrases.

Next, in a step S42, the main game screen (refer to FIG. 4B and FIG. 5B) is displayed on the first liquid crystal display 3. It should be understood that, at this time point, character strings are not displayed in the lyrics display section 22 and in the Alphabet letters display section 23, and also the displays of the score and the points in the score display section 27 are both "0".

Next, in a step S43, based on the image data which is stored in the image data storage region 56A, display of an image 20 of a PV related to the song which has been selected is started on the second liquid crystal display 4 (refer to FIG. 4A and FIG. 5A). Furthermore, via the speakers 8, output is performed both of the accompanying music, based on the musical accompaniment data which is stored in the musical accompaniment data storage region 56B, and of the voice, based on the voice data which is stored in the voice data storage region 56C. By doing this, the song is performed, and moreover the image 20 of the PV is reproduced along therewith.

Next, in a step S44, the lyrics of one phrase of the lyrics data which is stored in the RAM 54 are acquired. And a character string display procedure is performed (in a step S45) for displaying the character string 22A which corresponds to the lyrics data which have been acquired in the lyrics display section 22 of the main game screen 21. By doing this, a display of the main game screen 21 is performed on the first liquid crystal display 3 (refer to FIG. 4B and FIG. 5B), in parallel with the performance of the song and with the display of the PV image 20 on the second liquid crystal display 4.

Thereafter, based on the one phrase of lyrics data which has been acquired in the step S24, the number of characters n in this single phrase is calculated (in a step S46), and 0 is written into a variable m which is stored in the RAM 54 (in a step S47). Here, this variable m is a variable which is used in the input determination of characters corresponding to the characters which make up the single phrase, and it is incremented by 1 each time the input determination for one character is completed (in a step S54). Accordingly, in the input determination procedure which is repeatedly performed in the following steps S48 through S55, when m=t (where $0 \leqq t \leqq n-1$), input determination comes to be performed for the character which is positioned in the (t+1)th position from the head of the single phrase.

And, in a step S48, based on the operation signals from the keyboard 6, a determination is made as to whether or not a key input has been performed with a character input key 111. If it has been determined that a key input has been performed (S48: YES), then a correctness determination procedure for the key which has been inputted is performed (in a step S49), based on the type of the key which has been pressed down and on the determination standard data which is stored in the determination standard storage region 56E. In concrete terms, if a key which corresponds to the character string 22A which is displayed in the lyrics display section 22 (refer to FIG. 4B and FIG. 5B) of the main game screen 21 has been pressed down, then it is recognized as having been correctly typed. And, if it has been determined that any key other than this corresponding key has been pressed down, then 1 is added to the number of errors.

After this, the flow of control proceeds to a step S52.

On the other hand, if it has been determined (S48: NO) that no key input has taken place, then, based on information from the timer 58, a determination is made (in a step S50) as to whether or not a predetermined time period has elapsed (which, when the character at the head of the single phrase is to be inputted, measures from after the character string which corresponds to the single phrase on the main game screen 21 has been displayed (in the step S45), and which, when some other character is to be inputted, measures from after the calculation procedure for the score has been performed (in a step S53)). And if it is determined that the predetermined time period has not elapsed (S50: NO), then the flow of control returns to the determination procedure of the step 48.

On the other hand, if it has been determined by the CPU 51 that the predetermined time period has elapsed (S50: YES), then it is taken that key input by the player has not been performed, and 1 is added (in a step S51) to the number of errors in the current game which is stored in the RAM 54.

Next, in a step S52, a key illumination procedure for the full color LEDs 155 which are provided in the interiors of the keys of the keyboard 6 is performed. In concrete terms, with the typing game apparatus 1 according to this embodiment, if key input has been performed (S48: YES), and if moreover a determination has been made that this key has been correctly typed, then the character input key 111 which has been pressed down is illuminated in blue color. Furthermore if, while key input has been performed (S48: YES), a determination has however been made that this key has been mistakenly typed, then the character input key 111 which has been pressed down is illuminated in red color, while the correct key which should have been pressed down is illuminated in green color.

Furthermore, if no key input has taken place (S48: NO), then the correct key which should have been pressed down is illuminated in green color.

Moreover, in a step S53, a procedure for calculating the score is performed, based on the correctness determination procedure of the step S49 described above.

In this score calculation procedure, the score of the player for the current game which is stored in the RAM 54 is added to if, in the determination by the above correctness determination procedure, it has been determined that the typing is correct, and furthermore, if it has been determined that the corresponding character is typed at the same timing as that of the voice of the song which is performed, then the score is further added to.

Thereafter, in a step S54, the variable m which is stored in the RAM 54 is read out, +1 is added thereto, and it is again stored. Next, in a step S55, a determination is made as to whether or not the value of the variable m has arrived at the value n−1; in other words, it is determined whether or not the character input determinations for the characters which make up the single phrase have all been completed.

And, if it has been determined that the value of the variable m has not arrived at n−1 (S55: NO), then the flow of control returns back to the step S48, and the input determination is performed for the character which is positioned next in order among the characters which make up the single phrase.

On the other hand, if it has been determined that the value of the variable m has arrived at n−1 (S55: YES), then, since the input of all of the characters in the single phrase has been completed, a point addition procedure is performed in a step S56. In this point addition procedure, 1 is added to the points, if it has been determined that all of the n characters which make up the single phrase have been inputted without making any typing errors (including the determination of a typing error due to lapse of the predetermined time period (S51)).

Next, in a step S57, the character string 22A which is displayed in the lyrics display section 22 of the main game screen 21 is deleted. Thereafter, among the character strings which make up a single phrase which are displayed in the steps S45 through S57, those character portions which the player is able to type correctly during the game (hereinafter termed the correct response character strings), and those character portions which he is not able to type correctly (in concrete terms, character portions for which typing mistakes are made during the game, or character portions for which no input is made on time within the time period in which the character strings are displayed, both hereinafter termed erroneous response character strings) are separated, and a correct and incorrect character string separation procedure for storing them in the RAM 54 is performed (in a step S58). And, in the step S7, based on the character strings which have been separated by this correct and incorrect character string separation procedure, the display format for the lyrics character strings which are displayed on the lyrics results display screen 35 (refer to FIG. 6A) is changed. It should be understood that here, by the character strings which are correctly typed, is meant the character strings which are typed correctly by typing the corresponding characters while the character string 22A is displayed on the lyrics display section 22 (during the steps S45 through S57), irrespective of whether or not this typing agreed with the timing of the voice of the song which is being performed at that time.

Furthermore, in a step S59, a determination is made as to whether or not the input determination has been completed for all of the phrases of the stage corresponding to whichever is the current verse, among the plurality of verses which make up the song (normally one song consists of verses 1 to 3). And, if it has been determined (S59: NO) that input determination has not been completed for all of the phrases of one stage, then the flow of control returns to the step S44, and then the lyrics of the next phrase are acquired from the RAM 54, and the corresponding character strings are displayed in the lyrics display section 22 of the main game screen 21.

On the other hand, if it has been determined (S59: YES) that the input determination has been completed for all of the phrases for this current stage, then next a determination is made (in a step S60) as to whether or not the input determination has been completed for the phrases of all the stages (i.e. for the entire song).

And, if it has been determined that all of the stages have been completed (S60: YES), then, irrespective of the points currently possessed by the player, this typing game execution procedure is completed, and the flow of control shifts to the game result display procedure of the step S7. On the other hand, if it has been determined that all of the stages have not yet been completed (S60: NO), then a determination is made (in a step S61) as to whether or not the number of typing errors by the player up till the present, which has been added up in the above described steps S49 and S51, is less than a predetermined number. With the typing game apparatus 1 according to this embodiment, the game is made up from a plurality of stages which correspond to the number of verses in the song which is reproduced, and, at the time point that one stage has been completed, the condition in order to go on to perform the stage related to the next verse is that the number of typing errors from when playing started is less than a predetermined number (for example, that the number of typing errors is less than 20 when going on to perform the second verse after having played the portion corresponding to the first verse, and that it is less than 35 when going on to perform the third verse after having played the portion corresponding to the second verse).

And, if it has been determined that the number of typing errors by the player up till the present, which has been added up in the above described steps S49 and S51, is less than the predetermined number (S61: YES), then the flow of control returns to the step S44, and the lyrics which correspond to the first phrase of the next verse of the song are acquired from the RAM 54, and the corresponding character string is displayed in the lyrics display section 22 on the main game screen 21. And the input determination procedure is performed in the same manner. On the other hand, if it has been determined that the number of typing errors by the player up till the present is greater than or equal to the predetermined number (S61: NO), then this typing game execution procedure terminates, and the flow of control shifts to the game result display procedure of the step S7.

According to the above explanation, with this typing game apparatus 1 according to this embodiment, when a coin or the like is inserted into the coin insertion slot 9: the search mode selection screen 12 is displayed (in the step S11); either the "list of song names" or the "list of artist names" is set to the first display ordering, which becomes the basis for the display ordering of the songs (in the step S12); and, along with displaying the song selection screen 16 (in the steps S13 and S14) according to the display sequence setting table 67 based on this first display ordering which has been set, a particularly appealing portion of the song which is displayed in the song candidate display section 17 which has been selected with the song selection cursor 18 is displayed in the selected PV display section 19, and, further, the music corresponding to the appealing portion of the song is outputted via the speakers 8 (in the steps S15, S20, S26, and S33). Accordingly, by referring to the image of the PV related to the music data and to the music, the player is enabled to perform the selection of the song which he desires in a simple and easy and moreover reliable manner, only by the name of the song and the name of the artist which are displayed, even if he cannot completely specify the song. Yet further, there is no danger that he may mistakenly recognize a different song, since the display of the PV of the appealing portion, which is a particularly distinguishing portion, and the playing of the song are performed even during the song.

Furthermore since, in particular, even if the number of songs which have been collected together is very large, the specifying information related to the music data corresponding to the character string which has been inputted is displayed at higher priority than the other specifying information, accordingly it is possible for the user to perform the selection of the song in a simple and easy manner, so that it is possible to decrease the burden on the user.

Moreover since, when a character string for searching has been inputted on the song selection screen 16, those songs in which the characters which have been inputted are used in the head characters of their names or of their artist names are extracted from the "song names" or the "artist names" which are registered in the display sequence setting table 67, and the correspondence of the display order is changed so that the display ordering of the songs which have been extracted is earlier than that of the other songs (in the steps S18 and S24), and the display ordering of the songs which are displayed in the song candidate display sections 17 of the song selection screen 16 is changed (in the steps S19 and S25), accordingly, when the player is searching for a song which he wants, it is possible for him to perform the selection of the song which he desires in a quick and moreover simple and easy manner, even if a large number of songs have been compiled, since he can specify the song he wants with a range which is fixed in advance.

Furthermore since, with this typing game apparatus 1 according to this embodiment, there are provided the two liquid crystal displays, i.e. the first liquid crystal display 3 and the second liquid crystal display 4, and, along with displaying (in the step S43) an image 20 of the promotion video which is related to the song which is played on the second liquid crystal display 4 which is disposed at the upper portion of the housing 2, it is arranged to display (in the steps S42 and S45), on the first liquid crystal display 3 which is disposed at the lower portion of the housing 2, in parallel therewith, the main game screen 21 in which are displayed the character strings which correspond to the lyrics of the song, accordingly it becomes possible to provide a multicolored typing game using the display contents which are displayed on both of two screens, as compared with the case of using only a single display. Accordingly, the player who performs the typing game does not become bored, and it is possible to increase his motivation for playing this game.

Yet further, by performing the display of the image 20 of the promotion video by using an independent liquid crystal display, it becomes possible to provide a typing game in circumstances in which the figure of the artist who is singing is displayed along with the song being played, which is not the case with the prior art, so that realistic ambience is provided, and the player does not become bored.

It should be understood that the present invention is not limited to the embodiment described above; it would be possible to make various changes to the present invention, provided that its gist is not departed from.

For example, although in this embodiment the songs are displayed on the song selection screen 16, and they are displayed based on a display ordering in which, fundamentally, the "list of song names" or the "list of artist names" are sorted in the conventional Alphabet letters order, the present invention is not limited to the use of this ordering; a random ordering would also be acceptable. Moreover, it would also be acceptable to display the songs in the order in which they are newly distributed to the typing game apparatus 1 from the server 80. By doing this, it would become possible to display the songs while giving priority to those which could be newly played over the other older songs, so that it would be possible to enhance the motivation of the player to play the game.

Furthermore, although Alphabet letters are employed for the character string which is inputted to the search character string display section 91 in order to perform searching for a song, it would also be acceptable to employ Japanese kana characters. Moreover, apart from searching based on the name of a song or the name of its artist, it would also be acceptable to arrange to perform searching according to the genre of the song ("J-pop" or "enka" or the like).

Yet further although, in this embodiment, it is practiced to display the songs found by the search while giving priority to them in the display ordering over the other songs, it would also be acceptable to arrange to display only the songs which have been found.

Even further, it may be arranged to display the PV of the appealing portion of the song which is being selected by the song selection cursor 18 and to play its music by repeatedly playing an appealing portion of its first verse, or to arrange to display and play the appealing portions of each of its verses in cyclic order, as: the appealing portion of verse 1; the appealing portion of verse 2; the appealing portion of verse 3; and the appealing portion of verse 1 again. . . .

Still further, the typing game apparatus 1 according to these embodiments is connected to the server 80 via the network N such as the internet or the like which is capable of performing bi-directional communication, so that, based on data which is transmitted from the server 80, the music data stored on the HDD 55 (refer to FIG. 11) of the typing game apparatus 1 can be updated; but it would also be acceptable to make such a typing game apparatus as a device independent of any server 80, on which the image data and the music data can be updated.

Moreover although, by way of example, as the typing game apparatus according to the present invention, a typing game apparatus of a housing type which is set up in a game arcade or the like is explained, it would also be acceptable to apply the present invention to a typing game apparatus consisting of a PC on which software relating to a typing game is installed. Furthermore, by supplying the typing game of the present invention as a medium such as a cartridge or a CD-ROM or the like, it would also be possible to apply it to a household game apparatus. Moreover, it should be understood that this typing game could also be internally provided within a household game apparatus.

What is claimed is:

1. A game apparatus, comprising:

an image display which displays a predetermined image related to a game;

a music data storage unit which stores music data;

a music performance processing unit which plays a song based on the music data stored in the music data storage unit;

a game control unit which controls the game based on the song which is played by the music performance processing unit;

a specifying information display unit which displays, on the image display, specifying information which specifies the music data stored in the music data storage unit;

a character input unit which performs character input;

a music extraction unit which, based on characters inputted by the character input unit, extracts, from the music data stored in the music data storage unit, corresponding music data which corresponds to the characters which have been inputted;

a priority specifying information display unit, which displays, on the image display, specifying information which specifies the corresponding music data extracted by the music extraction unit, in priority before specifying information of other music data;

a specifying information selection unit which selects the specifying information which is displayed on the image display;

a selected music performance processing unit which plays a song related to the music data specified by the specifying information which has been selected by the specifying information selection unit; and a selected music image display unit which displays, on the image display, an image related to the music data specified by the specifying information which has been selected by the specifying information selection unit, wherein the selected music performance processing unit plays an appealing portion of the song related to the music data specified by the specifying information which has been selected by the specifying information selection unit, and the selected music image display unit displays a promotion video of the appealing portion of the song related to the music data specified by the specifying information which has been selected by the specifying information selection unit.

2. The game apparatus according to claim 1, wherein the image display comprises a first display section which displays a character string which is to be inputted during a typing game, and a second display section which displays an image.

3. The game apparatus according to claim 1, wherein the character input unit comprises a keyboard on which a plurality of keys which correspond to a plurality of characters are arranged, the game apparatus further comprising a correctness determination unit which determines whether or not a character string which has been inputted by the character input unit agrees with a character string related to the song which is played by the music performance processing unit, and wherein the game control unit controls the game, based on a result of determination by the correctness determination unit.

4. The game apparatus according to claim 3, wherein the character string related to the song which is played by the music performance processing unit comprises a character string which specifies lyrics of that song, and, after a correctness determination by the correctness determination unit has been completed, a character string which specifies an entire lyrics of the song is displayed on the image display in a scrolling manner.

5. A game apparatus, comprising:

an image display which displays a predetermined image related to a game;

a music data storage unit which stores music data;

a music performance processing unit which plays a song based on the music data stored in the music data storage unit;

a game control unit which controls the game based on the song which is played by the music performance processing unit;

a specifying information display unit which displays, on the image display, specifying information which specifies the music data stored in the music data storage unit;

a character input unit which performs character input;

a music extraction unit which, based on characters inputted by the character input unit, extracts, from the music data stored in the music data storage unit, corresponding music data which corresponds to the characters which have been inputted;

a priority specifying information display unit, which displays, on the image display, specifying information which specifies the corresponding music data extracted by the music extraction unit, in priority before specifying information of other music data;

a specifying information selection unit which selects the specifying information which is displayed on the image display;

a selected music performance processing unit which plays a song related to the music data specified by the specifying information which has been selected by the specifying information selection unit; and a selected music image display unit which displays, on the image display, an image related to the music data specified by the specifying information which has been selected by the specifying information selection unit, wherein the selected music image display unit displays a promotion video of an appealing portion of the song related to the music data specified by the specifying information which has been selected by the specifying information selection unit.

6. The game apparatus according to claim 5, wherein an ordering of the specifying information to be displayed on the image display comprises an ordering based on a search mode which is selected via a search mode selection screen displayed on the image display.

7. A game apparatus comprising:

an image display which displays a predetermined image related to a game;

a music data storage unit which stores music data;

a music performance processing unit which plays a song based on the music data stored in the music data storage unit;

a game control unit which controls the game based on the song which is played by the music performance processing unit;

a specifying information display unit which displays, on the image display, specifying information which specifies the music data stored in the music data storage unit;

a character input unit which performs character input;

a music extraction unit which, based on characters inputted by the character input unit, extracts, from the music data stored in the music data storage unit, corresponding music data which corresponds to the characters which have been inputted;

a priority specifying information display unit, which displays, on the image display, specifying information which specifies the corresponding music data extracted by the music extraction unit, in priority before specifying information of other music data;

a specifying information selection unit which selects the specifying information which is displayed on the image display;

a selected music performance processing unit which plays a song related to the music data specified by the specifying information which has been selected by the specifying information selection unit; and a selected music image display unit which displays, on the image display, an image related to the music data specified by the specifying information which has been selected by the specifying information selection unit, wherein the selected music performance processing unit plays an appealing portion of the song related to the music data which is specified by the specifying information which has been selected by the specifying information selection unit, wherein an ordering of the specifying information to be displayed on the image display comprises an ordering based on a search mode which is selected via a search mode selection screen displayed on the image display.

8. The game apparatus according to claim 7, wherein the ordering of the specifying information which is displayed on the image display is changeable according to input via the character input unit.

9. The game apparatus according to claim 7, wherein the specifying information which has been selected by the specifying information selection unit is indicated and shown on the image display by a specified music selection cursor, and is displayed in a larger size, as compared to the specifying information which is not being selected by the specifying information selection unit.

* * * * *